(12) United States Patent
Prvulovic et al.

(10) Patent No.: US 10,541,803 B2
(45) Date of Patent: *Jan. 21, 2020

(54) SYSTEMS AND METHODS FOR MEASURING SIDE-CHANNEL SIGNALS FOR INSTRUCTION-LEVEL EVENTS

(71) Applicant: GEORGIA TECH RESEARCH CORPORATION, Atlanta, GA (US)

(72) Inventors: Milos Prvulovic, Atlanta, GA (US); Nina Basta, Atlanta, GA (US); Robert Callan, Atlanta, GA (US); Alenka Zajic, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/023,838

(22) Filed: Jun. 29, 2018

(65) Prior Publication Data
US 2018/0323959 A1 Nov. 8, 2018

Related U.S. Application Data

(63) Continuation of application No. 14/934,121, filed on Nov. 5, 2015, now Pat. No. 10,015,006.
(Continued)

(51) Int. Cl.
*H04L 9/00* (2006.01)
*G09C 1/00* (2006.01)

(52) U.S. Cl.
CPC ............ *H04L 9/003* (2013.01); *G09C 1/00* (2013.01); *H04L 2209/12* (2013.01)

(58) Field of Classification Search
CPC ....... H04L 9/003; H04L 2209/12; H04L 9/00; G09C 1/00
(Continued)

(56) References Cited

U.S. PATENT DOCUMENTS

| 7,565,492 B2 | 7/2009 | Mckeen et al. |
| 8,000,473 B2 | 8/2011 | Goubin et al. |

(Continued)

FOREIGN PATENT DOCUMENTS

| CN | 104052590 | 9/2014 |
| WO | 2009075263 | 6/2009 |

OTHER PUBLICATIONS

Sugawara et al., "Spectrum Analysis of Cryptographic Modules to Counteract Side-Channel Attacks," 2009, EMC'09/Kyoto p. 21-24.
(Continued)

*Primary Examiner* — Ashokkumar B Patel
*Assistant Examiner* — Quazi Farooqui
(74) *Attorney, Agent, or Firm* — Troutman Sanders LLP; Ryan A. Schneider; Christopher C. Close, Jr.

(57) ABSTRACT

Aspects of the disclosed technology provide a method comprising executing different first and second instructions a first and second number of times, respectively, in repeated alternations. The method further comprises measuring spectra of signals emanating as a result of the processor executing the first and second instructions. The method also includes analyzing data indicative of the spectra of the signals to determine side-channel candidate side-band pairs that each have a lower and upper sideband at first and second frequencies, respectively, that are separated by approximately twice the respective alternation frequency. Finally, the method includes identifying a side-channel carrier frequency at a frequency approximately at a midpoint between a side-channel candidate side-band pair's first and second frequency.

19 Claims, 22 Drawing Sheets

Related U.S. Application Data

(60) Provisional application No. 62/075,427, filed on Nov. 5, 2014, provisional application No. 62/107,837, filed on Jan. 26, 2015.

(58) Field of Classification Search
USPC .......................... 380/28; 713/330, 375, 503
See application file for complete search history.

(56) References Cited

U.S. PATENT DOCUMENTS

| | | | |
|---|---|---|---|
| 8,341,758 B2 | 12/2012 | Kim et al. | |
| 8,848,903 B2 | 9/2014 | Hisakado et al. | |
| 8,892,903 B1 | 11/2014 | Trimberger | |
| 2007/0180285 A1* | 8/2007 | Dembo | G06F 21/75 713/500 |
| 2009/0228285 A1 | 9/2009 | Schnell | |
| 2010/0246808 A1 | 9/2010 | Hisakado et al. | |
| 2014/0143883 A1 | 5/2014 | Shen-Orr et al. | |
| 2016/0034022 A1* | 2/2016 | Sutardja | G06F 1/3203 713/320 |
| 2018/0287847 A1* | 10/2018 | Callaghan | H04L 27/389 |

OTHER PUBLICATIONS

Agrawal et al., "The EM Side—Channel(s): Attacks and Assessment Methodologies," accessed Jul. 9, 2015.

Yalcin, S., "Side-Channel Attacks on Hardware Implementations of Cryptographic Algorithms," Istanbul Technical University, accessed Jul. 9, 2015.

Frankland, R., "Side Channels, Compromising Emanations and Surveillance: Current and Future Technologies," Royal Holloway University of London, Mar. 8, 2011.

Sugawara, et al., "Spectrum Analysis of Cryptographic Moduls to Counteract Side-Channel Attacks," 2009, EMC'09/Kyoto p. 21-24.

\* cited by examiner

```
1   while(1){
2     // Do some instances of the A inst/event
3     for(i=0;i<inst_loop_count;i++){
4       ptr1=(ptr1&~mask)|((ptr1+offset)&mask);
5       // The A-instruction, e.g. a load
6       value=*ptr1;
7     }
8     // Do some instances of the B inst/event
9     for(i=0;i<inst_loop_count;i++){
10      ptr2=(ptr2&~mask)|((ptr2+offset)&mask);
11      // The B-instruction, e.g. a store
12      *ptr2=value;
13    }
14  }
```

| Instruction | | Description |
|---|---|---|
| LDM | mov eax,[esi] | Load from main memory |
| STM | mov [esi],0xFFFFFFFF | Store to main memory |
| LDL2 | mov eax,[esi] | Load from L2 cache |
| STL2 | mov [esi],0xFFFFFFFF | Store to L2 cache |
| LDL1 | mov eax,[esi] | Load from L1 cache |
| STL1 | mov [esi],0xFFFFFFFF | Store to L1 cache |
| ADD | add eax, 173 | Add imm to reg |
| SUB | sub eax, 173 | Sub imm from reg |
| MUL | imul eax, 173 | Integer multiplication |
| DIV | idiv eax | Integer division |
| NOI | | No instruction |

|      | LDM  | STM  | LDL2 | STL2 | LDL1 | STL1 | NOI  | ADD  | SUB  | MUL  | DIV  |
|------|------|------|------|------|------|------|------|------|------|------|------|
| LDM  | 1.8  | 2.4  | 7.9  | 11.5 | 4.6  | 4.4  | 4.3  | 4.2  | 4.4  | 4.2  | 5.1  |
| STM  | 2.3  | 2.4  | 8.8  | 11.8 | 4.3  | 4.2  | 3.8  | 3.9  | 3.9  | 4.3  | 4.2  |
| LDL2 | 7.7  | 7.7  | 0.6  | 0.8  | 3.9  | 3.5  | 4.3  | 3.6  | 4.8  | 3.8  | 6.2  |
| STL2 | 11.5 | 10.6 | 0.8  | 0.7  | 5.1  | 6.1  | 6.1  | 6.1  | 6.1  | 6.2  | 10.1 |
| LDL1 | 4.4  | 4.2  | 3.3  | 5.8  | 0.7  | 0.6  | 0.7  | 0.7  | 0.7  | 0.7  | 1.3  |
| STL1 | 4.5  | 4.2  | 3.8  | 4.9  | 0.7  | 0.6  | 0.7  | 0.6  | 0.6  | 0.6  | 1.2  |
| NOI  | 4.1  | 3.8  | 4.1  | 6.4  | 0.7  | 0.7  | 0.6  | 0.6  | 0.7  | 0.6  | 1.0  |
| ADD  | 4.2  | 4.1  | 4.1  | 7.0  | 0.7  | 0.7  | 0.6  | 0.7  | 0.6  | 0.6  | 1.0  |
| SUB  | 4.4  | 4.0  | 3.8  | 7.3  | 0.7  | 0.6  | 0.7  | 0.6  | 0.6  | 0.6  | 1.1  |
| MUL  | 4.4  | 3.9  | 3.7  | 5.7  | 0.7  | 0.7  | 0.6  | 0.6  | 0.6  | 0.6  | 1.1  |
| DIV  | 5.0  | 4.6  | 6.9  | 9.3  | 1.3  | 1.2  | 1.0  | 1.1  | 1.1  | 1.1  | 0.8  |

FIG. 10

|     | LDM | STM | LDL2 | STL2 | LDL1 | STL1 | NOI | ADD | SUB | MUL | DIV |
|-----|-----|-----|------|------|------|------|-----|-----|-----|-----|-----|
| LDM |     |     |      |      |      |      |     |     |     |     |     |
| STM |     |     |      |      |      |      |     |     |     |     |     |
| LDL2 |    |     |      |      |      |      |     |     |     |     |     |
| STL2 |    |     |      |      |      |      |     |     |     |     |     |
| LDL1 |    |     |      |      |      |      |     |     |     |     |     |
| STL1 |    |     |      |      |      |      |     |     |     |     |     |
| NOI |     |     |      |      |      |      |     |     |     |     |     |
| ADD |     |     |      |      |      |      |     |     |     |     |     |
| SUB |     |     |      |      |      |      |     |     |     |     |     |
| MUL |     |     |      |      |      |      |     |     |     |     |     |
| DIV |     |     |      |      |      |      |     |     |     |     |     |

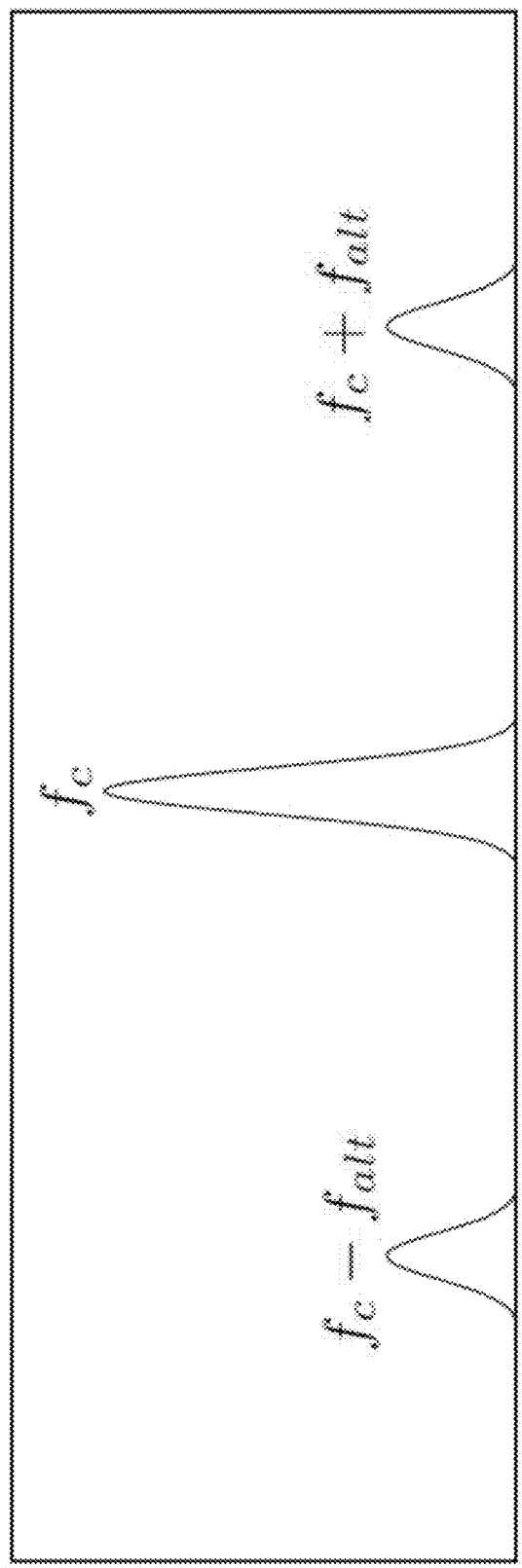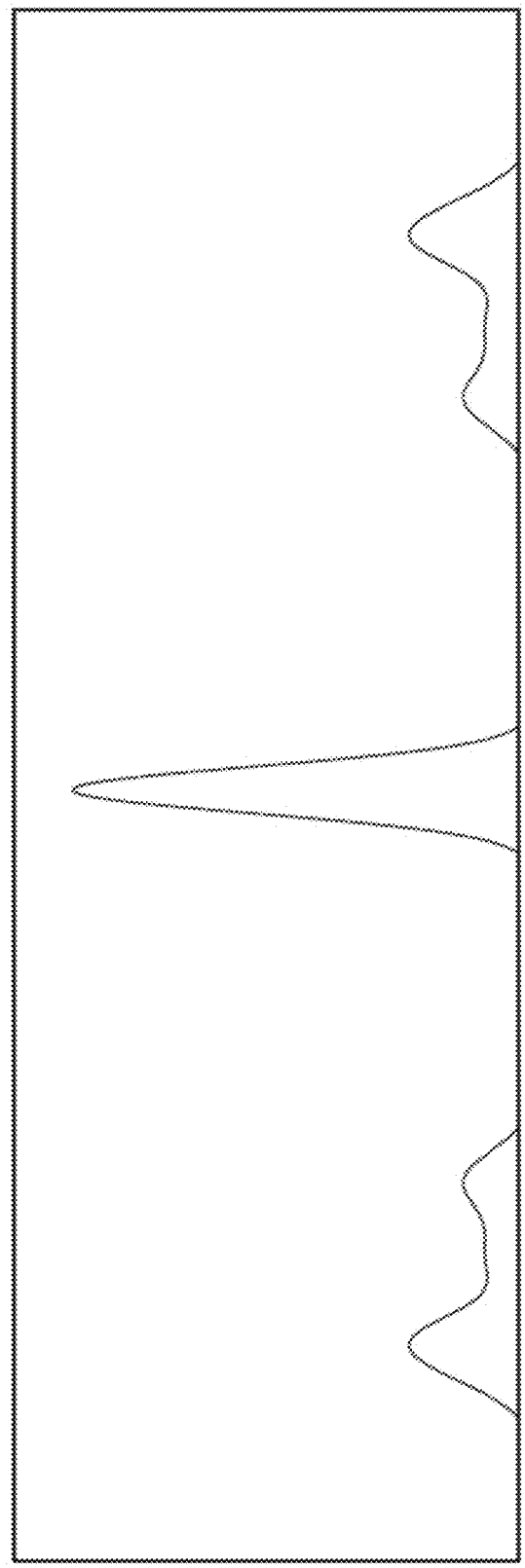

1400

```
1   while(true){
2       // Execute the X activity
3       for(i=0;i<inst_x_count;i++){
4           ptr1=(ptr1&~mask1)|(ptr1+offsets)&mask1);
5           // The X-instruction, e.g. a load from L2 cache
6           value=*ptr1;
7       }
8       
9       // Execute the Y activity
10      for(i=0;i<inst_y_count;i++){
11          ptr2=(ptr2&~mask2)|(ptr2+offsets)&mask2);
12          // The Y-instruction, e.g. a store from L2 cache
13          *ptr2=value;
14      }
```

FIG. 14

| Frequency Range (MHz) | $f_{res}$ (Hz) | $f_{ab_{f1}}$ (kHz) | $f_\Delta$ (kHz) |
|---|---|---|---|
| 0 to 4 | 50 | 43.3 | 0.5 |
| 0 to 120 | 500 | 43.3 | 5.0 |
| 0 to 1200 | 500 | 1800 | 100 |

FIG. 17

SYSTEMS AND METHODS FOR MEASURING SIDE-CHANNEL SIGNALS FOR INSTRUCTION-LEVEL EVENTS

CROSS REFERENCE TO RELATED APPLICATION

This application is a continuation, and claims the benefit under 35 U.S.C. § 120, of U.S. patent application Ser. No. 14/934,121 filed on Nov. 5, 2015, which claims benefit under 35 U.S.C. § 119(e) of U.S. Provisional Patent Application Nos. 62/075,427, filed 5 Nov. 2014, entitled "A Practical Methodology for Measuring the Side-Channel Signal Available to the Attacker for Instruction-Level Events", and 62/107,837, filed 26 Jan. 2015, entitled "FASE: Finding Amplitude-modulated Side-channel Emanations", which are incorporated herein by reference as if set forth herein in their entireties.

STATEMENT AS TO RIGHTS UNDER FEDERALLY SPONSORED RESEARCH

This invention was made with government support under grant 1318934, awarded by the National Science Foundation, and grant FA9550-14-1-0223, awarded by the Air Force Office of Scientific Research. The government has certain rights in the inventions.

BACKGROUND

Side-channels analysis and side-channel attacks have emerged as a powerful tool for data theft, particularly in the context of breaking encryption. Such side-channel attacks typically avoid traditional access controls and protections by exploiting physical or micro-architectural side-effects of computation. In other words, instead of exploiting the computation's overt (i.e., program- and ISA-specified) functionality, side-channel attacks exploit the fact that computation on physical devices transfer much more information than just the desired input-output information. And because computation involves a large variety of electronic and microarchitectural activity, there are numerous possible side channels that can be attacked. Side channel-attacks (or, simply "side channels") can include attacks to infer secrets (e.g. cryptographic keys) by, for example, observing power consumption, sound, electromagnetic (EM) emanations (i.e., "signals"), behavior under faults, and performance of shared caches, instruction caches, and branch predictors. In general, side channel attacks are carried out by identifying some physical or micro-architectural "signal" that leaks desired information about system activity or the data it processes, and then monitoring and analyzing that "signal" as the system operates. These side-channel signals are unintentional and are created as a side effect of internal system activity. For example, when a CPU executes instructions from RAM, the CPU creates unintentional electromagnetic emanations that can be received by attackers from outside the CPU's system, irrespective of other signals emitted by the system.

FIG. 1 illustrates an exemplary side-channel attack. In the example, while at a coffee shop, investment banker Alice makes several stock trades and writes sensitive emails using an encrypted connection to her employer's server. Alice's back is against the wall of the coffee shop because she does not want others to observe what she is doing. But the coffee shop is known to be visited frequently by investment bankers, so at the next table, Eve is recording EM emanations from Alice's laptop using an antenna hidden in a briefcase, Evan has installed a microphone under Alice's table to try to collect sound emanations from her laptop, and Evita has attached a power meter, disguised as a battery charger, into the wall socket where Alice's laptop is plugged in.

The work on understanding and quantifying potential side channel exposure at the microarchitectural and architectural levels is still in its infancy. Side channels that exploit shared hardware resources are relatively well understood in the microarchitecture community, and both hardware and software solutions have been proposed to alleviate or even completely close these side channels. Side channels based on physical side-effects (power consumption, sound, or EM emanations), however, are more difficult for microarchitects and programmers to alleviate, in part because the relationship between computational behavior and the resulting side-channel signal is very complex and poorly understood. Among these, EM emanations are potentially the most complex: the emanated signals may theoretically be anywhere in the EM spectrum, and signals at different frequencies may provide attackers with insight into different aspects of computational activity. In essence, EM side channels have many sub-channels that the attacker can potentially exploit.

To make matters worse, the EM side channel is also among the least risky for attackers to exploit because EM emanations can be covertly recorded from a distance without requiring physical modifications, physical connections, or system access. Thus, it is the most attractive for hackers. In contrast, exploits based on shared-resource side channels require attackers to run their "snooper" code in the same system as the victim programs. Power analysis attacks require power measurement equipment to be attached to the system's power supply, preferably at a point close to the processor where the rapid changes in the signal are not filtered out.

For both attacks and mitigation efforts, the first step is to identify signals that have some dependence on the secret information of interest. For example, differential power analysis (DPA) attacks determine which time offsets during an encryption operation give the most information about a particular secret key bit. In EM attacks, one typically identifies a range of frequencies where the signal varies depending on a secret key bit, then demodulates the signal at those frequencies or filters out non-useful frequencies. Many descriptions of successful side-channel attacks only briefly or implicitly address the underlying causes and mechanisms resulting in information leakage. This is because finding an information carrying signal and determining its cause are separate processes, and determining causation is not vital to extracting secret information.

However, mitigation is difficult without causation. Without a systematic approach to identification and causation, causation is a time-consuming trial-and-error process where one makes an educated guess as to the likely sources of information leakage, fixes the hypothesized problem, and sees whether leakage has been reduced. Further, while certain solutions assess the "leakiness" of a particular system and application over a given side channel, such solutions provide limited insight for computer architects about which architectural and microarchitectural features are the strongest (i.e., most egregious leakers) and for software developers to help them reduce the "leakiness" of their code.

SUMMARY

Briefly described, and according to some embodiments, aspects of the present disclosure generally relate to metrics for quantifying how strongly instruction-level events are leaked through a side channel; systems and methods for measuring side-channel signals from instruction-level events and providing such information to computer architects and software developers to help them improve their applications; systems and methods for systematically and efficiently identifying periodic signals whose amplitude changes as a result of specific changes in system activity.

These and other aspects, features, and benefits of the disclosed inventions will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 5 illustrates an exemplary code structure for implementing certain aspects of the disclosed systems and methods, according to an example embodiment.

FIG. 6 illustrates various x86 instructions 600 for use in A/B ASSILE measurements, according to some embodiments.

FIG. 9 is an exemplary resultant matrix of pairwise AB ASSILE values for a particular computing device being measured based on alternation frequency and antenna distance.

FIG. 10 shows the values of FIG. 9 illustrated as shades of gray, where white corresponds to the smallest ASSILE values and black to the largest ASSILE values.

FIG. 12C is an illustrative spectrum of a non-ideal carrier modulated by an ideal signal.

FIG. 12D is an illustrative spectrum produced by combining the non-ideal carrier shown in FIG. 12C with non-ideal modulating activity shown in FIG. 12B.

FIG. 14 illustrates an exemplary code structure for implementing certain aspects of the disclosed systems and methods, according to an example embodiment.

FIG. 17 illustrates various measurement parameters for use in a system for determining amplitude-modulated side-channel emanations, according to some embodiments.

DETAILED DESCRIPTION

Figure 1:
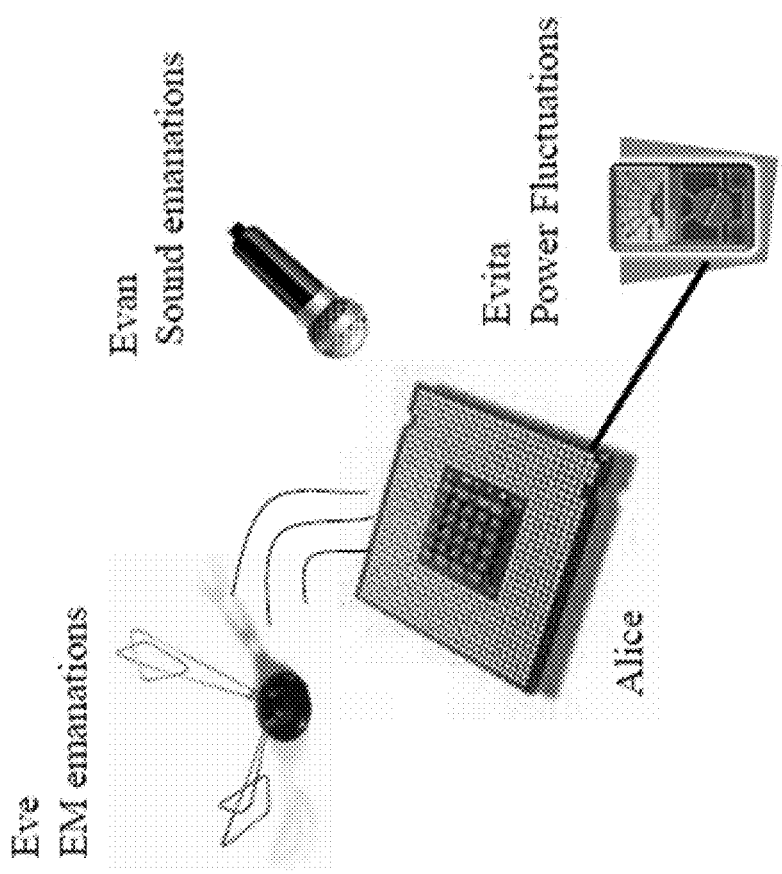
FIG. 1 illustrates an exemplary side-channel attack.

Certain embodiments of the disclosed technology provide systems and methods for measuring side-channel signal created by a specific single-instruction difference in program execution (i.e. the amount of signal made available to a potential attacker who wishes to decide if the program has executed instruction/event A or instruction/event B). Similarly, aspects of the disclosure may provide systems and methods for measuring available side-channel signal from an instruction-level event ("ASSILE"). In certain embodiments, the disclosed technology provides systems and methods for measuring ASSILE in computing systems using, for example, user-level access permissions and realistic measurement equipment. Additionally, aspects of the disclosure provide systems and methods for identifying amplitude-modulated ("AM") side-channel emanation signals. In some embodiments, systems and methods of the present disclosure identify such AM side-channel signals using, for example, specially designed benchmarks or micro-benchmarks to create certain spectral patterns and then processing the spectra to identify particular signals that exhibit AM-modulation behavior. Further, frequency-modulated ("FM"), phase-modulated ("PM"), and pulse-width modulated ("PWM") side-channel emanation signals exhibit similar (AM-like) spectral behavior, especially in scenarios that are common among modulated side-channel signals, such as FM side-channel signals whose frequency modulation constant is small. Thus systems and methods of the present disclosure also can be used to identify other modulated side-channel signals, for example those that exhibit FM, PM, or PWM.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that embodiments of the disclosed technology may be practiced without these specific details. In other instances, well-known methods, structures and techniques have not been shown in detail in order not to obscure an understanding of this description. References to "one embodiment," "some embodiments," "an embodiment," "example embodiment," "various embodiment," etc., indicate that the embodiment (s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example embodiments of the disclosed technology will now be described with reference to the accompanying figures.

Figure 2:
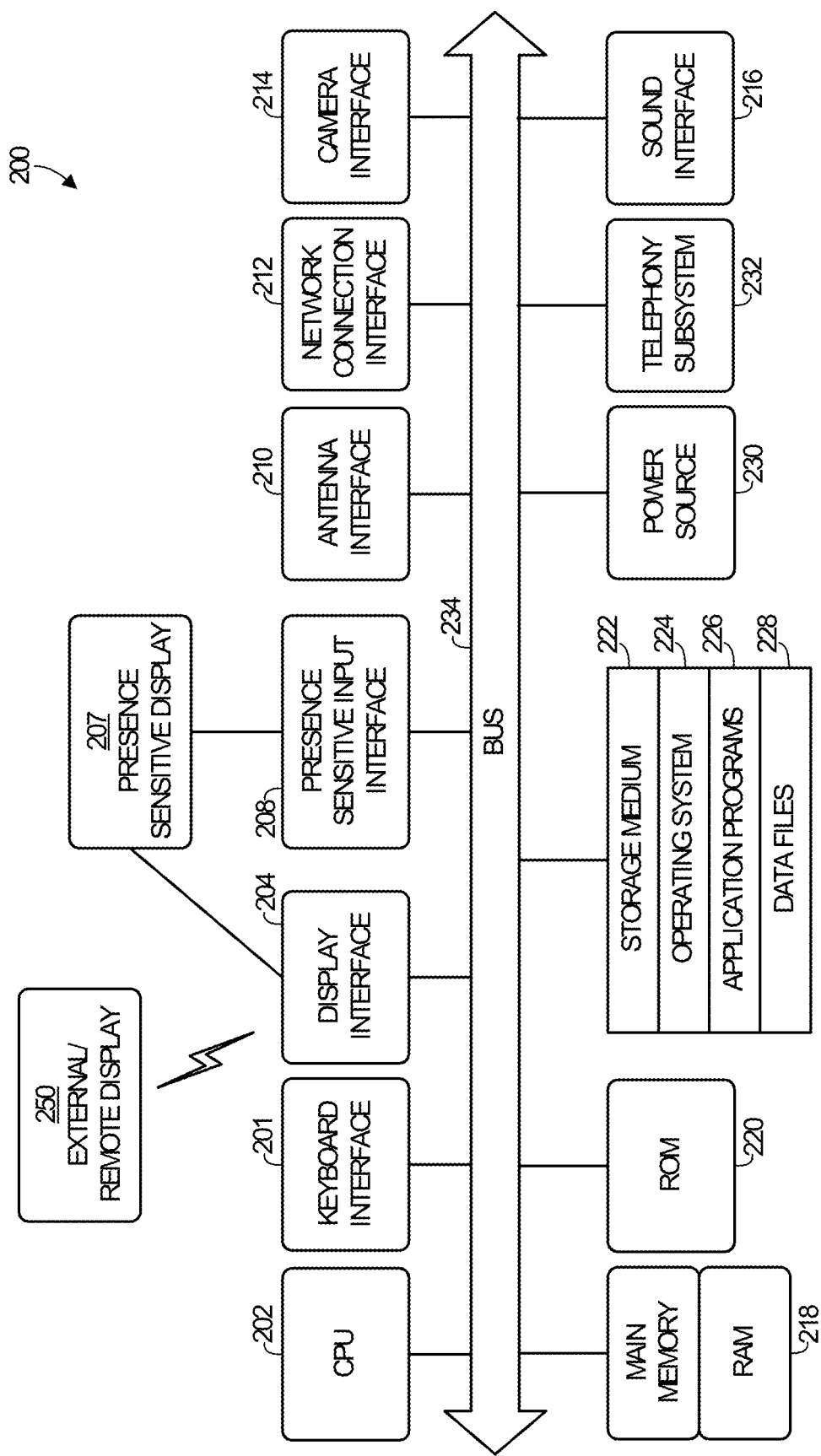
FIG. 2 is a block diagram of an illustrative computer system architecture 200, according to an example embodiment.

As desired, implementations of the disclosed technology may include a computing device with more or less of the components illustrated in FIG. 2. It will be understood that the computing device architecture 200 is provided for example purposes only and does not limit the scope of the various implementations of the present disclosed systems, methods, and computer-readable mediums.

The computing device architecture 200 of FIG. 2 includes a central processing unit (CPU) 202, where computer instructions are processed; a display interface 204 that acts as a communication interface and provides functions for rendering video, graphics, images, and texts on the display. In certain example implementations of the disclosed technology, the display interface 204 may be directly connected to a local display, such as a touch-screen display associated with a mobile computing device. In another example implementation, the display interface 204 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 204 may wirelessly communicate, for example, via a Wi-Fi channel or other available network connection interface 212 to the external/remote display.

In an example implementation, the network connection interface 212 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 204 may be operatively coupled to a local display, such as a touch-screen display associated with a mobile device. In another example, the display interface 204 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 204 may wirelessly communicate, for example, via the network connection interface 212 such as a Wi-Fi transceiver to the external/remote display.

The computing device architecture 200 may include a keyboard interface 206 that provides a communication interface to a keyboard. In one example implementation, the computing device architecture 200 may include a presence-sensitive display interface 208 for connecting to a presence-sensitive display 207. According to certain example implementations of the disclosed technology, the presence-sensitive display interface 208 may provide a communication interface to various devices such as a pointing device, a touch screen, a depth camera, etc. which may or may not be associated with a display.

The computing device architecture 200 may be configured to use an input device via one or more of input/output interfaces (for example, the keyboard interface 206, the display interface 204, the presence sensitive display interface 208, network connection interface 212, camera interface 214, sound interface 216, etc.,) to allow a user to capture information into the computing device architecture 200. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 200 or may be a separate device. For example, the input device may be an accelerometer, a magnetometer, a digital camera, a microphone, and an optical sensor.

Example implementations of the computing device architecture 200 may include an antenna interface 210 that provides a communication interface to an antenna; a network connection interface 212 that provides a communication interface to a network. As mentioned above, the display interface 204 may be in communication with the network connection interface 212, for example, to provide information for display on a remote display that is not directly connected or attached to the system. In certain implementations, a camera interface 214 is provided that acts as a communication interface and provides functions for capturing digital images from a camera. In certain implementations, a sound interface 216 is provided as a communication interface for converting sound into electrical signals using a microphone and for converting electrical signals into sound using a speaker. According to example implementations, a random access memory (RAM) 218 is provided, where computer instructions and data may be stored in a volatile memory device for processing by the CPU 202.

According to an example implementation, the computing device architecture 200 includes a read-only memory (ROM) 220 where invariant low-level system code or data for basic system functions such as basic input and output (I/O), startup, or reception of keystrokes from a keyboard are stored in a non-volatile memory device. According to an example implementation, the computing device architecture 200 includes a storage medium 222 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 224, application programs 226 (including, for example, a web browser application, a widget or gadget engine, and or other applications, as necessary) and data files 228 are stored. According to an example implementation, the computing device architecture 200 includes a power source 230 that provides an appropriate alternating current (AC) or direct current (DC) to power components.

According to an example implementation, the computing device architecture 200 includes and a telephony subsystem 232 that allows the device 200 to transmit and receive sound over a telephone network. The constituent devices and the CPU 202 communicate with each other over a bus 234.

According to an example implementation, the CPU 202 has appropriate structure to be a computer processor. In one arrangement, the CPU 202 may include more than one processing unit. The RAM 218 interfaces with the computer bus 234 to provide quick RAM storage to the CPU 202 during the execution of software programs such as the operating system application programs, and device drivers. More specifically, the CPU 202 loads computer-executable process steps from the storage medium 222 or other media into a field of the RAM 218 in order to execute software programs. Data may be stored in the RAM 218, where the data may be accessed by the computer CPU 202 during execution. In one example configuration, the device architecture 100 includes at least 128 MB of RAM, and 256 MB of flash memory.

The storage medium 222 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 222, which may comprise a machine-readable storage medium.

According to one example implementation, the term computing device, as used herein, may be a CPU, or conceptualized as a CPU (for example, the CPU 202 of FIG. 2). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As noted, information leakage through side channels occurs when that information creates a difference when a computing system executes instructions, and that instruction-level difference creates a detectable difference in the side-channel signal that is available to the attacker. Thus the difficulty with which an attacker can obtain the side-channel signal information depends on both program activity (i.e., what kind of information-dependent difference is created at the instruction level), and the side-channel signal's dependence on instruction-level differences in program execution. Aspects of the present disclosure provide systems and methods for quantifying this second property for a system (i.e., the available side-channel signal from an instruction-level event or "ASSILE") by determining how strong the side-channel signal created by a particular instruction-level difference is in execution, which in turn allows computer programmers to modify their code to avoid creating programs in which instruction-level differences that are detectable above a certain threshold depend on sensitive information, and which also allows computer architects and macro-architects to prioritize their side-channel mitigation efforts by focusing on similar instructions.

Aspects of the present disclosure also provide systems and methods for measuring the ASSILE for a pair of instructions in a system. Conventional approaches of measuring the signals for one instruction/event and then the other, and then computing the overall difference (i.e., the area between signal curves) is grossly inaccurate because a single instruction produces a very small change in a signal that might be much stronger, and because this change happens within a very short time. This typically results in a huge relative error for the computed difference both because the most sophisticated instruments generally cannot digitize the signal often enough to get enough data points for the short-duration signal difference to be accurately represented, and because practically achievable relative errors when measuring the two signals can create a huge relative error for their small difference. Thus, in some embodiments, systems and methods of the present disclosure create a pattern of activity in a computing system that alternates between two instructions/events, and then measure the periodic signal this alternation creates. Accordingly, the measured signal corresponds to a large number of instruction-pair differences, thus allowing measurement by instruments having a reasonable level of sensitivity. Furthermore, in some embodiments, the systems and methods measure the difference directly (with the instrument's normal relative error), and thus the measurement can be performed at a much lower frequency using a commercially available instrument.

As indicated, the results of these measurements can be provided to circuit designers and microarchitects to reduce susceptibility to side-channel attacks by focusing on certain high-ASSILE aspects of their designs (e.g., off-chip memory accesses, last-level-cache hits, the integer divider). Programmers, compilers, and algorithm designers can also use ASSILE to guide code changes to avoid using "loud" activity when operating on sensitive data. Although the disclosure focuses on the EM side channel, one of skill in the art will understand that various disclosed systems and methods can be used to characterize the relationship between instruction-difference and signal-difference in other side channels, especially acoustic and power-consumption side channels where instruments are readily available to measure the power of periodic signals created by aspects of the disclosed system and methods.

Aspects of the present disclosure also provide systems and methods for detecting and identifying amplitude-modulated side-channel emanations (or "ASE's"). In some embodiments, the disclosed systems and methods systematically and efficiently identify periodic signals whose amplitudes change as a result of specific changes in system activity (i.e., signals that are amplitude-modulated by system activity). Aspects of the disclosed systems and methods can use micro-benchmarks that cause repetitive changes in processor and memory activity, then processes the resulting EM signals to automatically find spectral patterns that correspond to amplitude modulation. To eliminate signals that match AM-modulation but do not respond to changes in program activity, certain embodiments can use several different measurements with slightly different activity patterns.

As will be appreciated, various aspects of the disclosed systems and methods for discovering AM-modulated signals are highly effective. The frequencies included in test systems utilizing the systems and methods include the entire AM radio spectrum and were performed without shielding in a major metropolitan area with hundreds of radio stations nearby. Furthermore, as is understood by one of skill in the art, computer systems produce thousands of periodic signals that are not modulated by system activity. The disclosed systems and methods typically successfully reject all such signals, while reporting the small number of remaining signals that are indeed modulated by test system activities.

Available Side-Channel Signal from an Instruction-Level Event

As will be understood by one of skill in the art, computer programs that use some data as an input will generate data-dependent activity in the processor and possibly also in the off-chip memory and other computer system components. This data-dependent activity can create signals in various side-channels. Data-dependent activity in the system cannot be avoided—even if a program's control flow does not depend on the value of the input, and if the circuitry of the processor is designed such that every operand value results in the exact same overall number of bit-flips in transistors and wires, there will be at least some transistors or wires whose switching activity is input-dependent. This difference in transistor/wire activity creates a difference in various physical side-channel signals, such as, for example, EM emanations, power consumption, and various other side-channel signals. Process variations, physical location of the circuit, and other factors allow side-channel signals to be created even if the circuitry is designed to minimize the operand-dependent variations in overall activity. While these factors can reduce the magnitude of data-dependent signal variation, they cannot completely eliminate them.

Most side-channel mitigation techniques are expensive, especially if applied very broadly. For example, circuit-level techniques that mask input-dependent variations in overall activity do so by performing more activity overall. In other words, when actual inputs require little activity, the system performs additional unnecessary activity to match what happens for high-activity values. This technique minimizes variations in power consumption, but the costs of these techniques are high and include large increases in chip area (for dummy-activity circuitry), execution times that match the worst-case inputs, and power consumption that typically equals the peak power consumption.

To allow judicious use of side-channel mitigation techniques, aspects of the present disclosure quantify the amount of side-channel signal that is made available to an attacker when there is a particular variation in processor and system activity. In some embodiments, to quantify this amount, the systems and methods first choose the granularity for variation in activity. For example, at the coarsest granularity, the systems and methods can consider execution of different programs, which provides some ability to compare different systems in terms of their "leakiness" in a particular side channel for a particular application, but which does not provide much guidance for where to apply mitigation techniques. A next level of granularity can consider program phases, which can allow more robust comparisons of different systems and specific mitigation approaches, but which does not provide specific feedback about where mitigation might be needed or what type of mitigation might be appropriate. At another extreme, the systems and methods can measure overall side-channel signals created by transistor- and wire-granularity variation in activity, which can allow some low-level layout optimizations. But such level of granularity can be difficult to measure on typical computing systems as it can require triggered activity on a specific transistor or wire while creating little or no activity on all other transistors and wires in the system, and the feedback is generally only useful to those with layout-level knowledge of the system's design. In other words, it would be largely meaningless to programmers and unsuitable for most architecture-level studies Accordingly, aspects of the present disclosure typically focus on an instruction-level event as the level of granularity, which allows for real-system measurements and provides specific mitigation to programmers and computer architects. So, certain embodiments of the present disclosure measure the overall signal that is made available to an attacker through a side channel as a result of a single-instruction variation (e.g., executing a different instruction because of a control-flow decision, having or not having a cache miss, and other single-instruction variations). In some embodiments, the systems and methods measure the signal made available to an attacker when a computing system executes instruction/event A instead of executing instruction/event B (or vice versa). For example, a system of the present disclosure can determine an ADD/MUL available side-channel signal from an instruction-level event ("AS-SILE"), which is the overall amount of the side-channel signal that tells an attacker whether a computing system has executed an ADD or a MUL instruction. Further, a system of the present disclosure can determine an LDM/LDL2 ASSILE, which is the overall amount of the side-channel signal that can tell an attacker whether a computing system had an L2 hit or an off-chip memory access for a load instruction. Systems and methods of the present disclosure can also define a single-instruction ASSILE as the maximum of the pairwise ASSILEs where both events in the pair are generated using the same instruction. For example, the ASSILE for a load instruction can be the maximum of pairwise LDM/LDM, LDM/LDL2, LDM/LDL1, etc. ASSILEs.

Systems and Methods for Measuring ASSILE

According to certain embodiments, systems and methods of the present disclosure measure ASSILE for a pair of instructions in a given computing system by forcing the computing system to execute those two instructions/events in a way that minimizes the activity variations from all other activities of the computing system, and then measuring the resulting side-channel signals.

Figure 3:
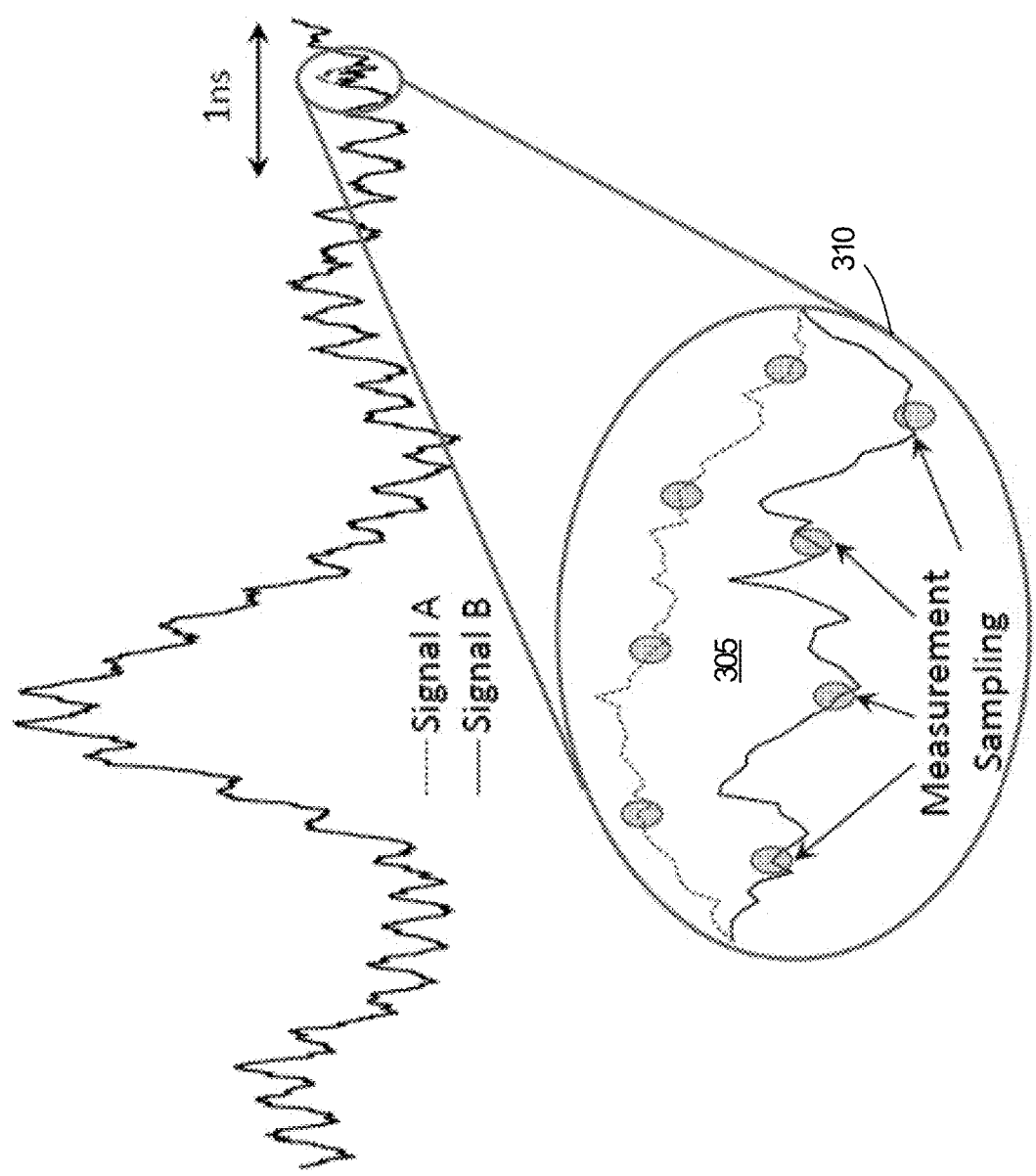
FIG. 3 illustrates a conventional approach for measuring an A/B ASSILE in a given computing system.

FIG. 3 illustrates a conventional approach for measuring an AB ASSILE in a given computing system. As shown in FIG. 3, when using a conventional approach, a given computing system executes a program fragment that performs instruction/event A and records the side-channel signal, then executes an identical program fragment but now with instruction/event B instead of A, records the side-channel signal again, then aligns the two signal curves in time to compute the area 305 between the two curves. As will be understood by one of skill in the art, however, this conventional approach suffers from three major problems. First, in many side channels, the signal change from a single instruction/event is extremely weak relative to the overall signal (e.g., for EM emanations, the signal energy produced by a single-instruction/event is well below the detection threshold of a high-end measurement instrument). Second, the difference between signals is usually much smaller than the magnitude of these signals, and the measurement error is often relative to the magnitude of the measured signal. Thus, the relative error in the computed difference can be very large. For signals shown in FIG. 3, for example, random measurement error that averages 0.5% of the signal's range will make the two overall curves have a total difference that is greater than five times as large as the actual difference (area 305). Finally, as shown in FIG. 3, the execution of instructions/events of interest takes very little time. For example, the ADD/SUB ASSILE generally is based on comparing signals that each last only a fraction of a nanosecond, and accurate assessment of their difference requires many samples (at least 10, preferably more) to be collected during that time. This requires instruments with an extremely high real-time sampling rate. Unfortunately, real-time instruments (oscilloscopes or A/D converters) that can digitize signals at rates of about 50 Gsam-ples/s cost hundreds of thousands of dollars, and instruments with significantly higher rates (e.g. 100 GSamples/s) are not commercially available. In conventional approaches, the few samples that are collected during the "interesting" time period provide a very coarse representation of the signals, and additional error may be produced if the sample in the two measurements are not aligned with each other (as shown in the magnified part 310 of FIG. 3).

Figure 4:
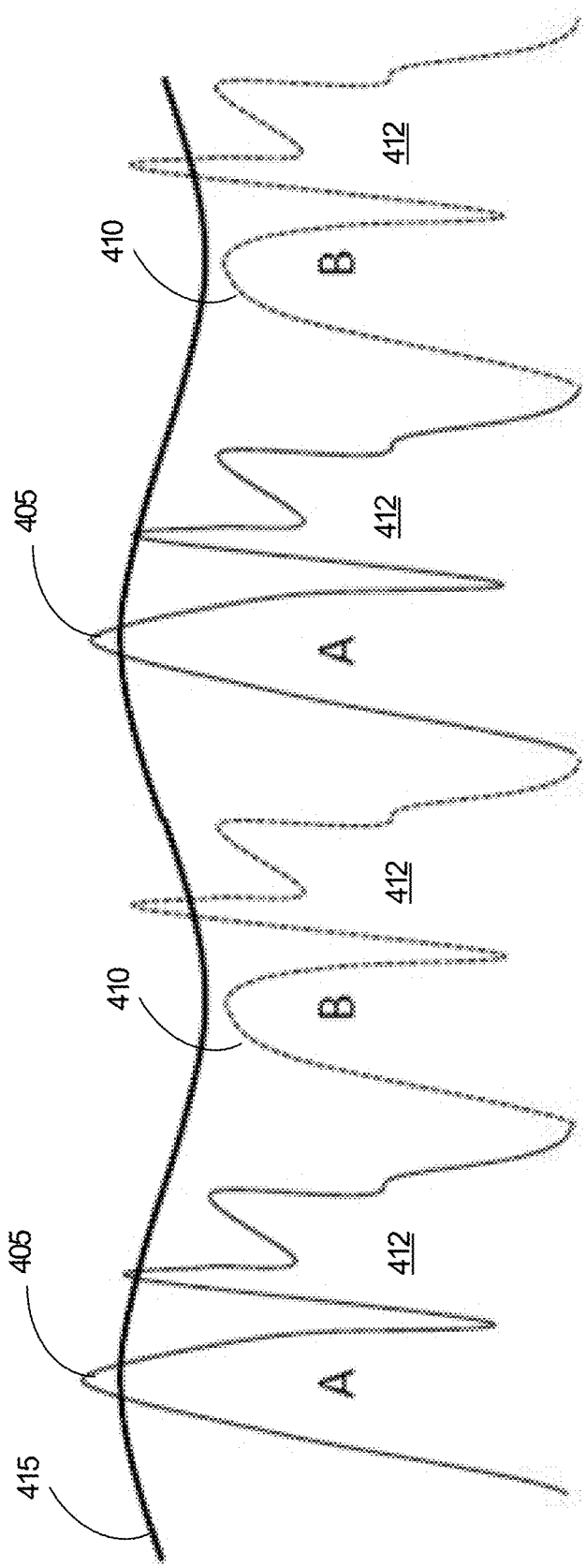
FIG. 4 illustrates a measurement of the difference between the signals produced by two alternating instructions executed by a given computer system, according to an example embodiment.

To overcome deficiencies in the conventional approach illustrated in FIG. 3, and as shown in FIG. 4, in some embodiments, systems and methods of the present disclosure for measuring the difference between signals A 405 and B 410, which are produced by instructions that cause a given computer system to alternate between two instructions/ events, event A and event B, many times per second. As will be appreciated, this alternation generates a periodic signal represented by sinusoid 415 at the alternation frequency that generally corresponds to the overall difference between the individual signals 405 and 410. Aspects of the disclosed systems and methods can filter this periodic signal to reject other frequencies, which can include external noise, the electromagnetic noise created by the measured system, and other side-channel signals that correspond to instructions that are not A or B but may be necessary to implement the alternation between A and B. For example, embodiments of the disclosed systems and methods allow measurement of the difference between signals 405 and 410, which correspond to instructions in lines 5 and 11 of FIG. 5, while rejecting from the measurement most of the noise and also signals 412 that correspond to the rest of program code shown in FIG. 5. Further, aspects of the disclosed systems and methods can measure the magnitude of the periodic signal represented by sinusoid 415. For EM emanations, power, sound, and other side-channel signals, the disclosed systems and methods can perform such filtering and measuring very precisely using, for example, a spectrum analyzer. The spectrum obtained in this way measures the difference in signal strength between A and B instructions/ events over a unit time (e.g. a second), and overcomes the various measurement problems described in relation to FIG. 3.

In particular, systems and methods of the present disclosure provide a measured signal that is the total of many repetitions of the AB difference that occur over a defined time period, which avoids instrument-sensitivity issues. Further, the disclosed systems and methods can still compute a single-instruction/event ASSILE by dividing the measured signal by the number of A/B instances that occur during the given time period, but the instrument only needs to be sensitive enough to measure the total for the time period. Further, aspects of the disclosed systems and methods can directly measure the difference between A and B side-channel signals (e.g., 405 and 410) without the relative-error problem that persists when measuring A and B signals 405 and 410 separately. Finally, in some embodiments, the disclosed systems and methods can measure the signal at the alternation frequency, which can be adjusted by changing the number of A and B events per iteration of the alternation loop, which can in turn bring that frequency within the measurement capabilities of commercially available instruments. Additionally, embodiments of the disclosed systems and methods provide the freedom to select a frequency with relatively little noise, which is an important consideration for EM emanation side channels where direct collection of A and B side-channel signals is subject not only to measurement error but also to noise from various radio signals.

FIG. 5 illustrates an exemplary code structure 500 for implementing certain aspects of the disclosed systems and methods, according to an example embodiment. As shown in FIG. 5, lines 2 through 7 of the exemplary code structure 500 execute inst_loop_count instances of a first instruction event (i.e., the A instruction/event), and then lines 8 through 13 execute the same number of instances of a second instruction event (i.e., the B instruction/event). Thus, depending on the value of int_loop_count, the code structure 500 may cause a processor to alternately execute the A and B instructions/events (i.e., where inst_loop_count=1), or the code structure 500 may cause the processor to, for example, execute instruction/event A 15 times and then execute instruction/event B 15 times (i.e., where inst_loop_count=15). Accordingly, in some implementations, lines 2 through 13 represent A/B alternation in which A/B are executed a predetermined number of times according to inst_loop_count, and the A/B alternation repeats (as shown at line 1) until the measurement of the side-channel signal is complete. As will be appreciated, the adjustable value of inst_loop_count allows for control of the number of alternations per time period (e.g., per second), and in exemplary embodiments, a value can be selected that produces the desired alternation frequency for the relevant measurements.

In example embodiments, the exemplary code structure 500 can generate different cache behavior in load and in store instructions as 4 and 10, as shown in FIG. 5, update the address of the accessed location so the memory access repeatedly sweeps over an array of appropriate size (e.g., fits in L1 cache, does not fit in L1 but fits in L2 cache, or does not fit in L2) for creating cache hit/miss behavior. Further, in some embodiments, an exemplary code structure 500 can utilize separate pointers in the A-instruction and B-instruction code to allow them to create different cache behavior when needed (e.g. A can be a L1 cache hit and B can be a L2 cache hit). In exemplary embodiments, aside from the test instruction (e.g., line 6 for A and line 12 for B), the code structure 500 is generally identical for all instructions/events, so this pointer-update code is present even when the A and/or B instruction is a non-memory instruction (e.g., ADD). In exemplary embodiments, code structure 500 can be written in x86 assembler to minimize the amount of non-under-test activity and to prevent compiler optimizations that might make the non-under-test code differ for different under-test instructions (e.g., different instruction scheduling by the compiler, dead code elimination of memory address updates for non-memory instructions, etc.). FIG. 6 illustrates various x86 instructions 600 for use in A/B ASSILE measurements, and that have been subjected to A/B ASSILE measurements, according to some embodiments.

In some embodiments, code structure 500 can be constructed for each pairwise combination of the various instructions 600 shown in FIG. 6. As will be understood, these include loads and stores that go to different levels of a computing system's cache hierarchy, simple (ADD and SUB) and more complex (MUL and DIV) integer arithmetic, and the "No instruction" case where the appropriate line in the code structure 500 (e.g., line 6 or 12) is simply left empty.

In example implementations, the code structure 500 can be executed in a computing system as, for example, a single-threaded 32-bit user mode console application to determine the various side-channel signals emanated by the computing system when the system executes the instructions. Exemplary systems of the present disclosure can utilize a magnetic loop antenna (e.g., an AOR LA400) connected to a spectrum analyzer (e.g., spectrum analyzer MXA N9020A from Agilent) to measure or detect side-channel signals that result from execution of the various instructions. Thus, in some embodiments, a system for EM side channel measurements of a computing device may comprise (i) the computing device to be measured, (ii) a code structure (e.g., code structure 500) to be executed by the computing device to be measured, and (iii) a magnetic loop antenna connected to a spectrum analyzer (the "measuring apparatus") for determining the various side-channel signals emanated by the computing device when executing the instructions. In some embodiments, the computing device may have an 80 kHz alternation frequency, though other alternation frequencies are contemplated. Further, a system of the present disclosure can utilize a computing device-to-antenna distance of, for example, 50-100 cm, though greater or lesser distances are contemplated.

Figure 7:
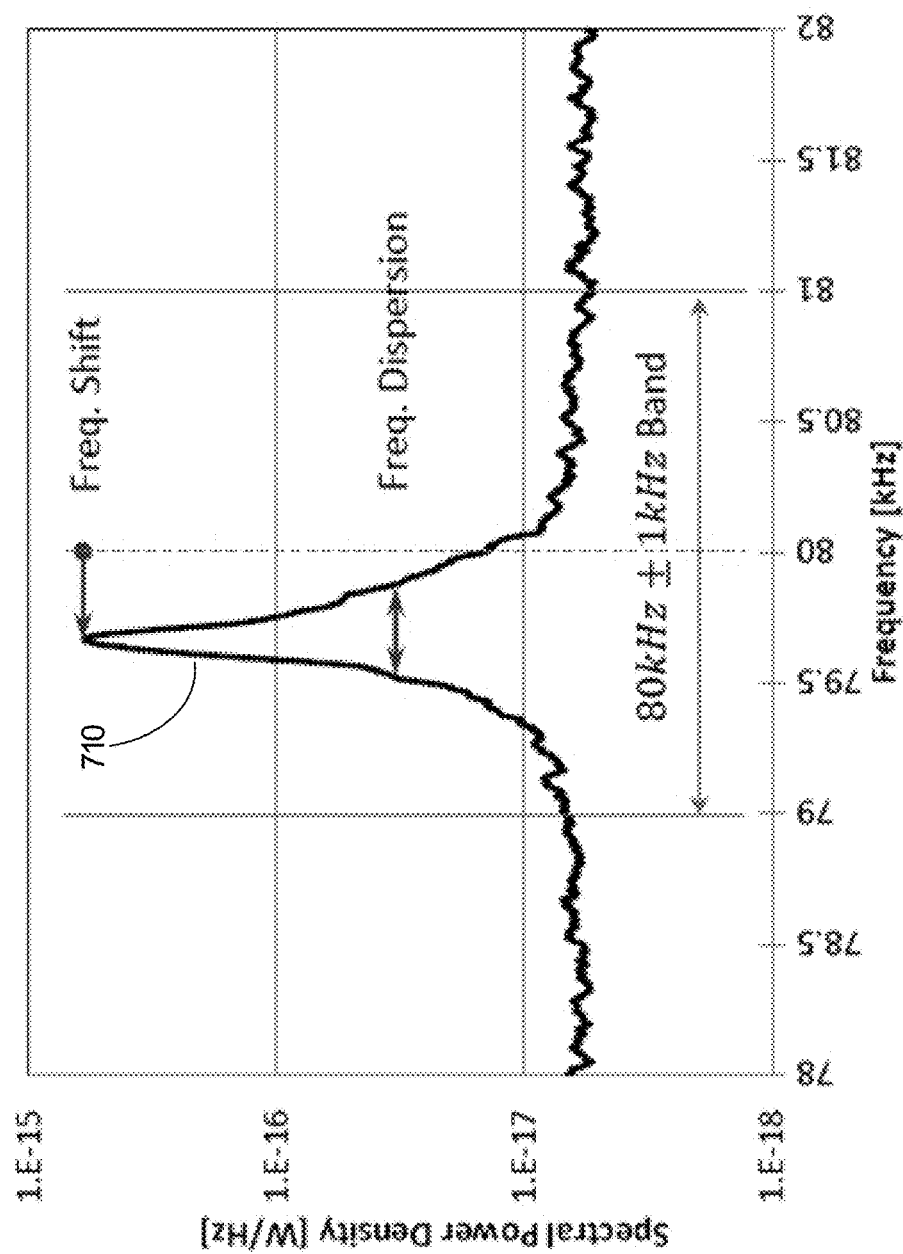
FIG. 7 is an exemplary recorded spectrum for an ADD/LDM measurement as captured by an embodiment of a system of the present disclosure.

In some embodiments, the measuring apparatus can record the spectrum around the alternation frequency with a resolution bandwidth of, for example, 1 Hz. As will be appreciated, such a resolution can provide a very low noise floor because the measured signal is affected only by noise from a 1 Hz-wide spectral band. FIG. 7 illustrates an exemplary recorded spectrum 700 for an ADD/LDM (i.e., an add instruction and off-chip load instruction) measurement as captured by an embodiment of a system of the present disclosure.

As will be understood, because the alternation frequency in the running code cannot be controlled perfectly, the actual measured signal 710 is not perfectly concentrated at the intended alternation frequency (i.e., 80 kHz for the FIG. 7 example). The actual alternation frequency can be slightly different and, as shown in FIG. 7 example, is shifted lower by about 400 Hz. Further, as will be understood, the actual alternation frequency can vary during the measurement, so it can be dispersed around the central frequency (as indicated in FIG. 7). Thus, in some embodiments, the measured value utilized by the disclosed systems and methods can be the total received signal power (or alternatively, "signal energy") in the frequency band (or alternatively, "frequency range") from, for example, 1 kHz below to 1 kHz above the alternation frequency, and a determined power spectral density within the frequency band represents the different between the first signal energy resulting from execution of the first instruction and second signal energy resulting from execution of the second instruction. Thus, as shown in FIG. 7, the frequency band is from approximately 79 kHz to 81 kHz. In some embodiments, for each A/B measurement, the code structure 500 causes the computing device to execute the same number of A instructions and B instructions per designated time period (e.g., per second) so, in some implementations, the disclosed systems and methods divide this total signal power by the number of executed A/B pairs. As will be understood, because power (energy/second) is divided by the instruction-pairs/second, the resulting ASSILE quantity is actually the signal energy available to an attacker to help the attacker discern whether the computing device executed a single A or a single B instruction. Finally, in some embodiments, the systems and methods can perform each measurement campaign multiple times (e.g., 10 times) to generate an 11-by-11 pairwise A/B ASSILE. Further, the systems and methods can perform the various measurement campaigns over multiple days or at different times to assess how the measurement is affected by changes in radio signal interference, room temperature, errors in positioning the antenna, and other factors.

Figure 8:
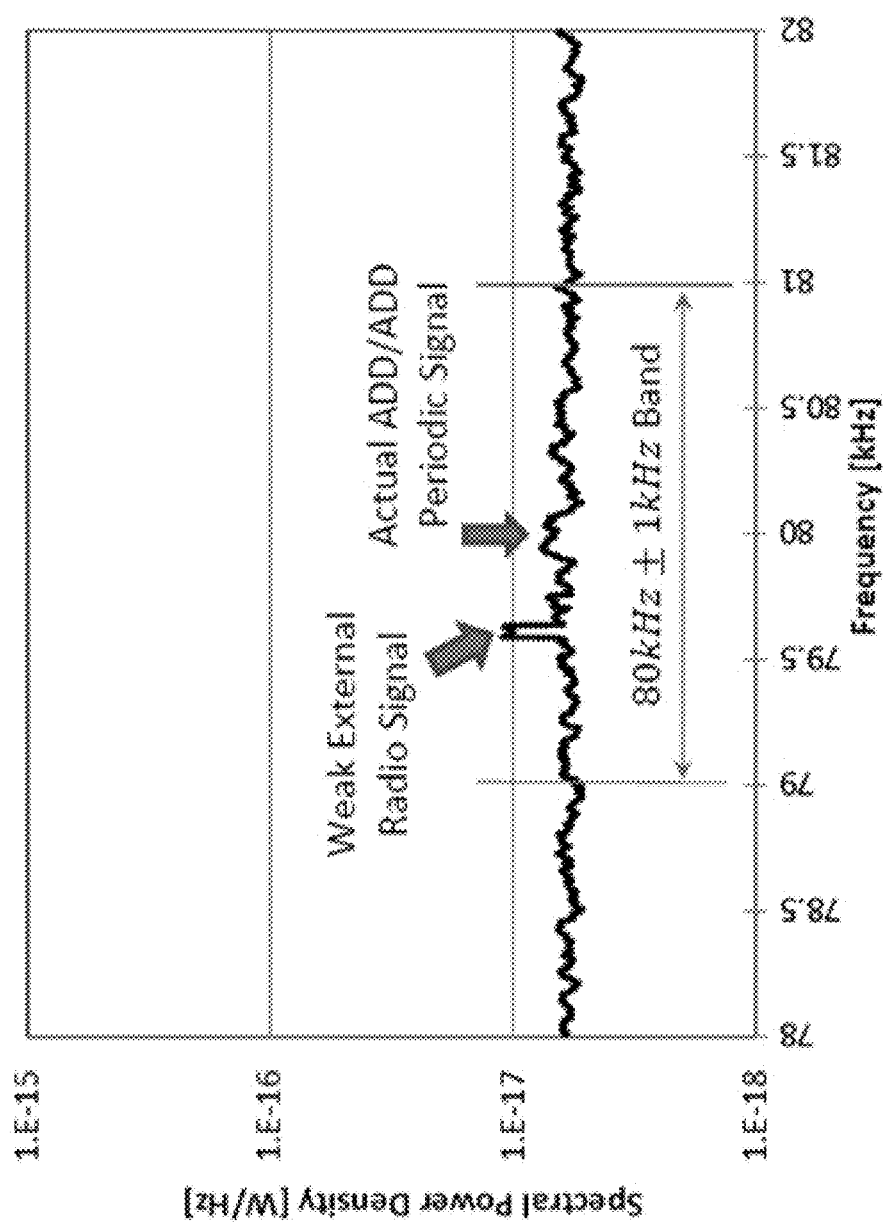
FIG. 8 is a measured spectrum for ADD/ADD instructions, as acquired by an example embodiment of a system of the present disclosure.

In some embodiments, the disclosed systems and methods can measure all 11 cases, based on the instructions 600 shown in FIG. 6, where A and B are the exact same instruction/event. As will be understood, in such scenarios, the resulting A/B alternation should result in no signal at the alternation frequency. FIG. 8 is an actual measured spectrum 800 for ADD/ADD instructions, as acquired by an example embodiment of a system of the present disclosure. As shown in FIG. 8, though no signal should occur in theory at the alternation frequency because the instructions are identical, some signal does exist in the band around the intended alternation frequency. In general, this is explained by the measuring apparatus's sensitivity floor (which is around 6×10−18 W/Hz in the example illustrated by FIG. 8), external radio signals, and a weak signal created by imperfect matching of A/B not-under-test activity. Therefore, as will be appreciated, these same-instruction alternation measurements provide a good estimate of the experimental measurement error and can help identify possible problems such as strong radio interference or mistakes in the A/B alternation code. Further, in certain implementations, the disclosed systems and methods measure both the A/B alternation and the B/A alternation when A and B instructions/events are not the same. As will be appreciated, these measurements should be the same, and any measured difference provides an opportunity to assess the measurement error caused by placing identical instructions at different program addresses (i.e., the effect of fetch-related variations such as instruction cache alignment).

Experimental Results for EM Side Channel Measurements

As noted previously, in some embodiments, systems and methods of the present disclosure can perform a measurement campaign for the 11 instructions shown in FIG. 6, though a measurement campaign can include more or less instructions. In the case of a measurement campaign of the instructions shown in FIG. 6, the resultant campaign provides an 11-by-11 matrix of pairwise AB ASSILE values for the computing device being measured based on alternation frequency and antenna distance. FIG. 9 is an exemplary resultant matrix for a particular computing device with 10 cm distance and 80 kHz intended alternation frequency. As will be understood and appreciated, the values shown in FIG. 9 are in the zepto-joules (1 zJ=10−²¹ J), which indicates that one occurrence of a single-instruction difference would probably not be sufficient for an attacker to decide which of the two instructions was executed. Instead, such information is valuable to a hacker only where many repetitions of the same instruction occur. Alternatively, a hacker needs a sample set of many instructions worth of difference. Luckily for the hacker, and unfortunately for everyone else, repetition is common for some kinds of sensitive data. For example, a cryptographic key can be reused many times while encrypting a long stream of data.

FIG. 9 does illustrate, however, large variations in ASSILE among various instruction pairs. As will be appreciated, such variations indicate that some instruction pairs are much easier for attackers to disambiguate than others. To help visualize these variations, FIG. 10 shows the values of FIG. 9 illustrated as shades of gray, where white corresponds to the smallest ASSILE values and black to the largest ASSILE values. Similarly, FIG. 11 shows the ASSILE values for selected instruction pairings from FIG. 9 as a traditional bar chart.

As can be seen in FIG. 10, four groups of instructions/events have low intra-group and higher inter-group ASSILEs: The off-chip access group (LDM and STM), the L2 hit group (LDL2 and STL2), an Arithmetic/L1 group that includes ADD, SUB, MUL, NOI, and also LDL1 and STL1, and a group that only contains the DIV instruction. Further, FIG. 10 shows that the ASSILE between instructions in the Arithmetic/L1 group is similar to the same-instruction measurement (e.g. ADD/ADD). In other words, it is possible to deduce, based on the measured data, that it would be challenging for attackers to distinguish between instructions in Arithmetic/L1 group. Further, as will be understood, although their functionality is quite different, FIG. 10 shows that L1 cache accesses likewise are difficult to distinguish from ADD/SUB/MUL arithmetic instructions. Additionally, as one of skill in the art would expect, FIG. 10 shows that L2 accesses and main-memory accesses are easier to distinguish from other instructions. Also, as shown in FIG. 10, an L2 store hit is easier to distinguish from other instructions than is an L2 load hit. It is possible that this ease in distinction results from the fact that the executed code structure (e.g., code structure 500) cannot create a sustained string of L1 write misses without also creating dirty replacements from L1 to L2. In other words, each STL2 instruction typically creates two L2 accesses—one to fetch the block from the L2 cache into L1, and later another that writes back the dirty block from L1 to L2. So, it is possible that the higher ASSILE values for STL2 might be attributable to write-back activity caused by such instructions.

As shown in FIG. 10, the DIV instruction has noticeably higher ASSILE values than ADD, SUB, and MUL, which is unexpected. It is also surprising that, as shown in FIG. 10, off-chip memory accesses and L2 hits have similar ASSILE. This suggests that the task of distinguishing between LDM and ADD using EM emanations is similar in difficulty to the task of distinguishing between LDL2 and an ADD which, as will be understood by one of skill in the art, is contrary to the intuitive expectation that off-chip accesses should create stronger emanations because they toggle long off-chip wires that can act as better transmission antennae for EM emanations. FIG. 10 does show, however, that off-chip memory accesses have an even higher ASSILE when paired with L2 hits than when paired with other instructions.

Figure 11:
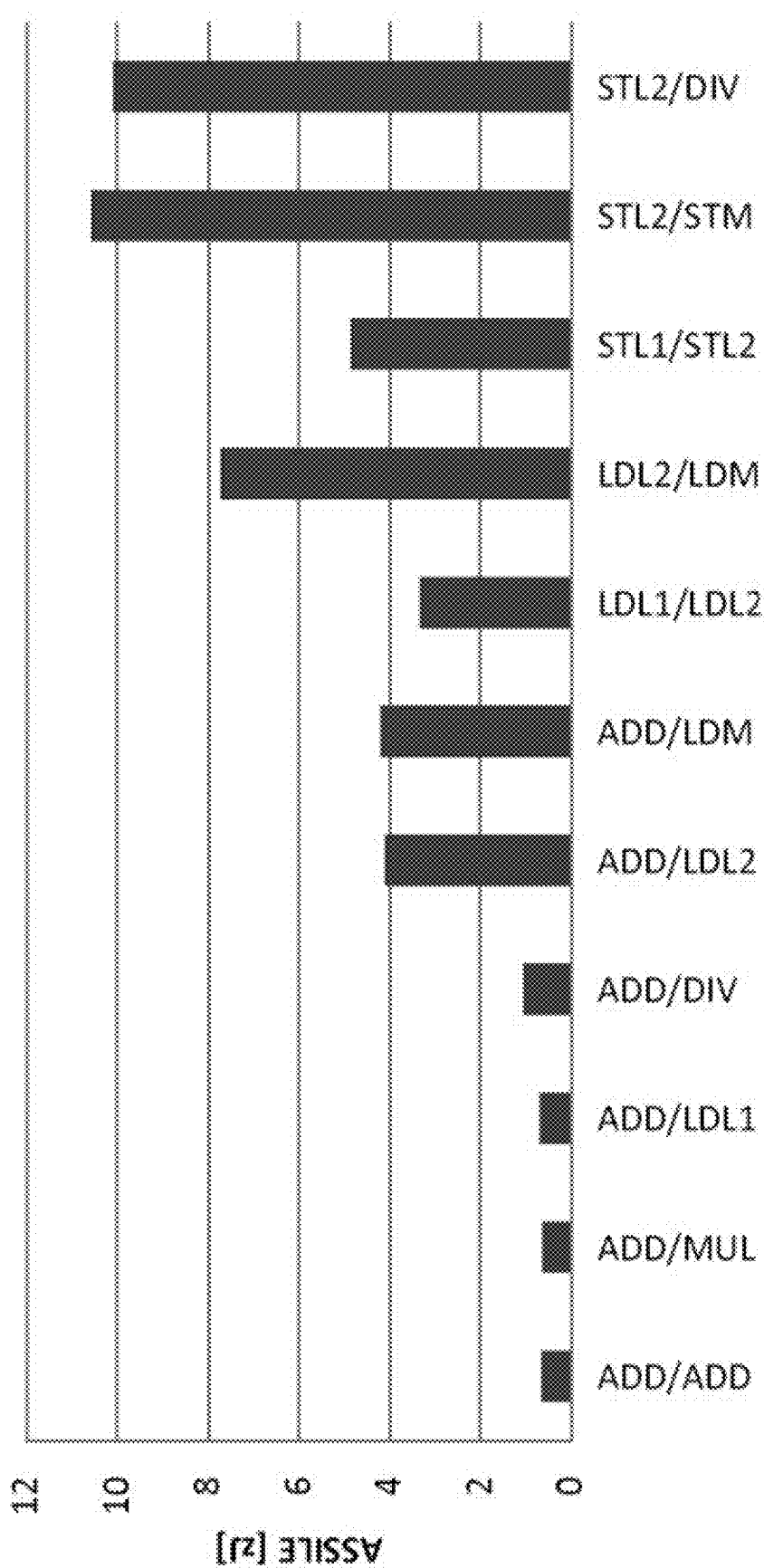
FIG. 11 shows the ASSILE values for selected instruction pairings from FIG. 9 as a traditional bar chart.

As will be appreciated, for computer architects who desire to reduce the potential for EM side-channel attacks on their processors, the results shown in FIGS. 9-11 suggest that the path of least resistance for attackers is in code that utilizes off-chip accesses, L2 cache accesses, and possibly DIV instructions in ways that depend on sensitive data. Accordingly, an architect's focus should be on making execution of these instructions less EM-noisy through, for example, limited use of compensating-activity techniques. Similarly, as will be appreciated, for programmers, these results confirm that for code that processes sensitive data, special care should be taken to avoid situations where a memory access instruction might have an L2 hit or miss depending on the value of some sensitive data item. Code that does not have data-dependent variation in cache hit/miss behavior is considerably less vulnerable to EM side channel attacks, and as FIGS. 9-11 suggest, the most worrisome situation in that code would be one where a DIV instruction is executed or not depending on sensitive data instruction, e.g. when a control flow decision based on sensitive data selects between a path that includes a DIV instruction and another that does not. Accordingly, ASSILE results generated from embodiments of the present disclosure can be useful to architects who wish to identify (and alleviate) the aspects of their processor and system that are the most susceptible to EM side channel vulnerabilities, especially those that are endemic to that processor. Further, ASSILE results can be used by software developers who need to know which variations in program behavior are the most likely to allow successful side-channel attacks, especially for behaviors that are consistently vulnerable across several generations of processors and among several processor manufacturers. Accordingly, in one embodiment, a software developer could utilize the disclosed systems and methods to test variations in code behavior to determine which variation is most susceptible to an attack. For example, if a developer has two (or more) options for implementing a particular instruction, the developer can utilize embodiments of the disclosed system and methods to pair option 1 and option 2 with a follow-up instruction and determine which transition (i.e., the transition from option 1 to the follow-up instruction or the transition from option 2 to the follow-up instruction) is "nosier" (i.e., provides the greater amount of signal to a potential hacker who wishes to determine whether or not the option 1/option 2 event has occurred).

Finding Amplitude-Modulated Side-Channel Emanations

Aspects of the present disclosure also provide systems and methods for systematically and efficiently identifying periodic signals whose amplitudes change as a result of specific changes in system activity (i.e., signals that are amplitude-modulated by system activity). For example, and as will be discussed, systems and methods of the present disclosure utilize micro-benchmarks that can cause repetitive changes in processor and memory activity in a computing device and then automatically process the resulting EM signals to automatically identify spectral patterns that correspond to amplitude modulation. As will be appreciated, identifying such signals provides insight into the nature of the activity that modulates the signals. Further, identifying such signals can provide insight into which parts of a computing device or computing system leak information about some aspect of program activity, which can be used to reduce the strength of such periodic signals and to weaken their modulation (i.e. disrupt the connection between program behavior and the variations in activity that modulates such signals), which in turn makes them more difficult for hackers to identify and renders the systems less susceptible to side-channel attacks. For example, in the case of memory refresh signals, this would involve randomization of the interval between refresh commands, while modulation-weakening efforts might involve careful scheduling of memory accesses to avoid their interaction with refresh activity, or even program changes, to ensure that when processing sensitive data the program's memory activity is independent of the data values.

Aspects of the disclosed systems and methods can identify signals that are AM-modulated by computing device activity by relying, at least in part, on how the spectrum of a periodic carrier signal is affected by a modulating activity. While the spectral properties of AM-modulated signals generally are well-understood, embodiments of the present disclosure encounter issues that are not encountered in traditional uses of AM signals (e.g., telecommunications).

A brief introduction to the general properties of AM modulation is provided below, which is helpful for understanding certain systems and methods of the present disclosure. Further information is provided how modulated signals are affected by the irregularities of "accidental" side-channel transmission.

Figure 12A:
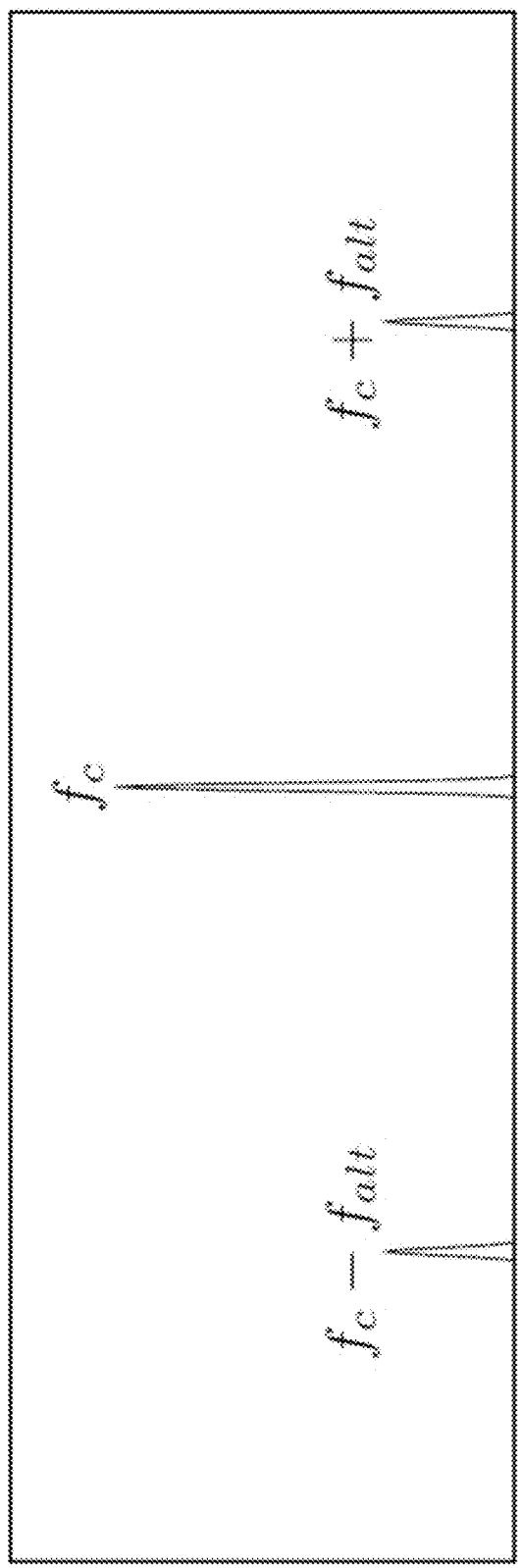
FIG. 12A is an illustrative spectrum of an ideal carrier signal modulated by an ideal sinusoidal signal.

FIG. 12A is an exemplary spectrum of an ideal carrier signal (at frequency $f_c$) that is modulated by an ideal sinusoidal signal whose frequency is $f_{alt}$. In addition to the signal at the carrier frequency, this spectrum has strong "side-band" signals at frequencies that are $f_{alt}$ away from the carrier frequency (i.e., at frequencies $f_c-f_{alt}$ and $f_c+f_{alt}$). As will be understood by one of skill in the art, this would be the spectral pattern to look for when a periodic signal has a perfectly stable frequency and is modulated by a pattern of activity with a fixed period of $T_{alt}=1/f_{alt}$ with no variation in timing. Of course, no such ideal conditions exist in reality, but it is helpful to to introduce non-idealities one at a time.

Figure 12B:
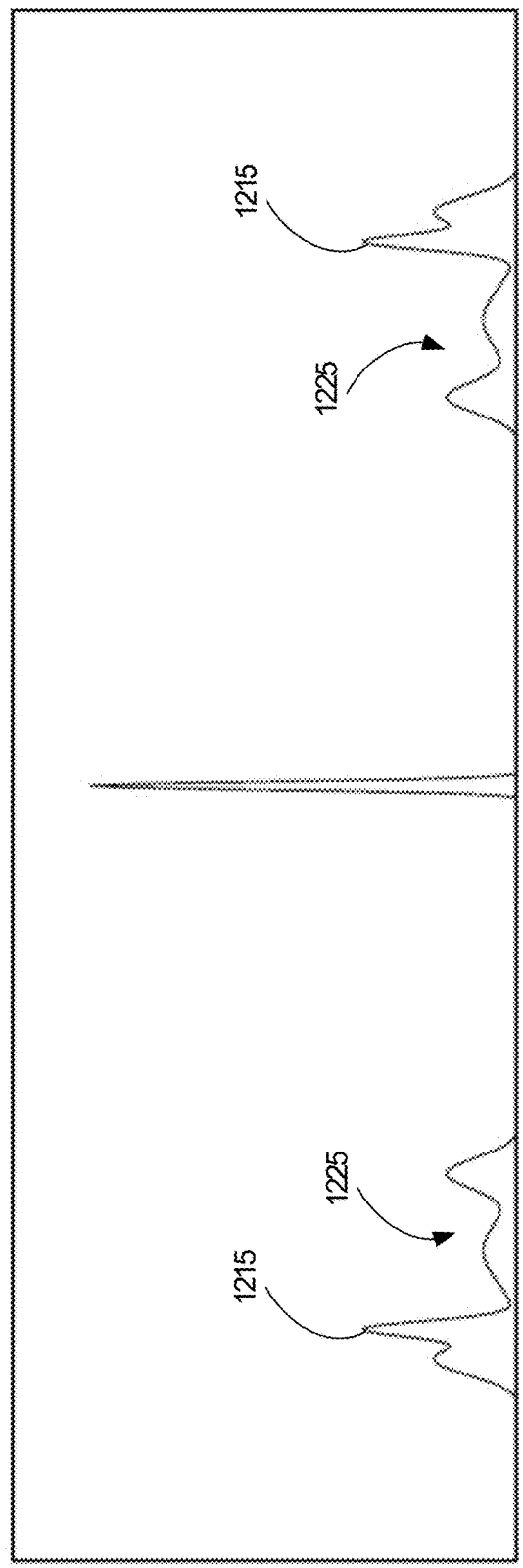
FIG. 12B is an illustrative spectrum of an ideal sinusoidal carrier modulated by a realistic signal.

FIG. 12B is an illustrative spectrum of an ideal sinusoidal carrier modulated by a realistic signal, such as program activity. As shown in FIG. 12B, the two side-band signals from FIG. 12A now correspond to the spectrum of the modulating activity. The tallest spike 1215 in each side-band signal corresponds to the dominant periodic behavior of that activity, and the smaller "bumps" 1225 in each side-band signal indicate other common periods of repetition. This type of non-ideality is typical for program-generated repetitive behavior where for a given task, the time each repetition of the task takes is not always the same, but there are often several commonly occurring execution times among the repetitions. For example, in multi-processor or SMT systems, the repetitions of a loop may take longer or shorter depending on timing variations due to resource contention with other running threads.

FIG. 12C is an illustrative spectrum of a non-ideal carrier modulated by an ideal signal. The spectrum for the carrier is now spread around its nominal value and this spreading is also present in the two side-band signals. Even though $f_{alt}$ is perfectly stable, the side-bands at $f_c-f_{alt}$ and $f_c+f_{alt}$ will "inherit" the instability of $f_c$. Many periodic signals are spread out in this manner in computer systems. For example, spread-spectrum clocking results in deliberate spreading of the clock signal's frequency. Additionally, many periodic activities (e.g. voltage regulator switching) do not require precise timing, so they often use less stable (cheaper/simpler) oscillators.

Figure 13:
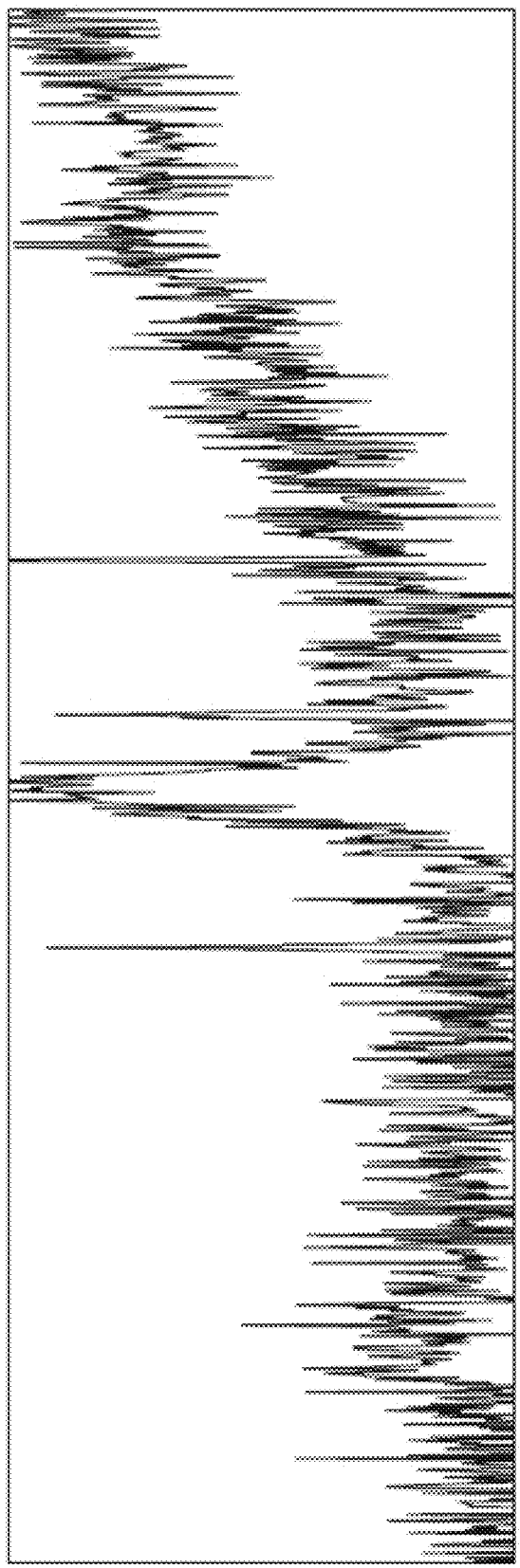
FIG. 13 is an illustrative spectrum containing periodic signals from both inside and outside the system that are either unmodulated, AM-modulated by non-program activity, and AM-modulated by program activity.

Finally, FIG. 12D is an illustrative spectrum produced by combining the non-ideal carrier shown in FIG. 12C with non-ideal modulating activity shown in FIG. 12B. In addition to the examples provided in FIG. 12, several other non-ideal properties of computer systems are manifested in measured spectra. For example, randomly timed switching activity causes broadband noise, and this noise appears as gently rolling "hills" and "valleys" in the spectrum. Additionally, the spectrum contains periodic signals from both inside and outside the system that are either unmodulated or that are AM-modulated (e.g., AM radio broadcasting), but are not modulated by program activity. Accordingly, the overall result resembles a spectrum 1310 as shown in FIG. 13. Thus, as shown in FIG. 13, even when the carrier and program-activity frequencies is known, it is hard to decide whether the spectrum contains an activity-modulated signal by visual inspection. Aspects of the presently disclosed utilize several specially generated program activities in conjunction with a heuristic carrier likelihood function to automate certain decision processes and overcome these problems.

As will be understood by one of skill in the art, many periodic carrier signals in computer systems are generated by digital circuits and clocks, and therefore have sharp transitions that are best approximated by rectangular pulses instead of the sinusoidal waves used as carriers in communications systems. The spectrum of a pulse train with an arbitrary duty cycle is equivalent, via Fourier analysis, to a set of sinusoids with various amplitudes at $f_c$ and its multiples (i.e., harmonics). In other words, for each carrier signal generated by a digital circuit or clock, additional carrier signals also will be present at $2f_c$, $3f_c$, $4f_c$, $5f_c$, etc. As the duty cycle of a signal approaches 50%, the amplitudes of the odd-numbered harmonics ($2f_c$, $3f_c$, $5f_c$, etc.) reach their maximum, while amplitudes of the even harmonics ($2f_c$, $4f_c$, etc) trend toward zero. For a small duty cycle (i.e., a duty cycle less than 10%) the magnitudes of the first few harmonics (both even and odd) decay approximately linearly. Finally, as will be appreciated, these observations imply the amplitudes of all the harmonics are a function of the duty cycle. Thus, if program activity modulates the duty cycle of a periodic signal while keeping its period constant (i.e., the program causes pulse width modulation), all of the signal's harmonics are amplitude-modulated and consequently will be identified by implementations of the presently disclosed systems and methods.

Creating System Activity at Controlled Frequencies

The spectrum of a modulated signal around a carrier frequency $f_c$ is easier to recognize where systems and methods generate periodic processor and/or memory activity that repeats $f_{alt}$ times per second (or other designated time period). As discussed previously, code structures similar to code structure 500 can generate periodic activity for demonstrating the presence of EM emanations from computer systems and for creating measurable periodic signals at arbitrary frequencies. FIG. 14 illustrates one such exemplary code structure 1400, according to an example embodiment. Aspects of the present disclosure can further utilize code structures similar to code structure 1400 to generate a carrier signal at some chosen frequency $f_c$, such that alternation at $f_{alt}$ can be used to measure and/or anticipate AM-modulation of any potential carrier signals intrinsically generated (and emanated) by the system.

As an example of how alternation of activity can AM-modulate a carrier signal, consider the DRAM clock. Activity X may involve many LLC misses, so it results in substantial DRAM activity. During the X-activity half-period, the DRAM clock drives a lot of switching activity (i.e., current flowing through wires), which results in strong emanations at the DRAM clock frequency. If activity Y has little DRAM activity, then the DRAM clock drives much less switching activity, which generates much weaker emanations at the DRAM clock frequency. Therefore, the amplitude of the emanations at the DRAM clock frequency will change with period $T_{alt}$ (frequency $f_{alt}$), meaning that emanations at the DRAM clock frequency will be AM-modulated by the X/Y periodic behavior whose frequency is $f_{alt}$.

As will be understood by one of skill in the art, switching between activity X and activity Y is abrupt. Accordingly, in some embodiments, code structure 1400 can be implemented such that the inst_x_count and inst_y_count variables are adjusted so that activity X and activity Y each are done for half of the alternation period (50% duty cycle). Thus, as will be appreciated, the spectrum of each side-band around the carrier's frequency $f_c$ also will have odd-numbered harmonics of the alternation frequency (i.e., the side-band signal will have spikes/peaks at $f_c \pm 3f_{alt}$, $f_c \pm 5f_{alt}$, etc., in addition to at $f_c \pm f_{alt}$. Also, in some implementations, code structure 1400 can be implemented to control the alternation frequency $f_{alt}$ by changing the loop counts, which allows for creation of several spectra having different $f_{alt}$. Accordingly, the resulting spectra can be considered jointly in an effort to distinguish which carriers are modulated by a particular activity.

Typically, embodiments of the disclosed systems and methods generate results for different X/Y pairings that provide a strong indication of which aspect of the computing device being evaluated modulates a given carrier signal. For example, when the disclosed systems and methods provide a signal at a particular frequency $f_c$ that is modulated by X/Y alternation between memory activity and on-chip activity, but remains unmodulated when alternating between two types of on-chip activity, the carrier signal and/or its modulation mechanism are likely related to the memory controller, processor-memory communication, or the DRAM memory itself.

Detecting Amplitude-Modulated Side-Channel Emanations

As will be appreciated, and as discussed prior, discovery of activity-modulated carriers by "eyeballing" spectrum 1310 (or similar spectrum) without generating controlled system activity provides significant challenges when attempting to glean meaningful information from the spectrum 1310. In theory, one could look for narrow spikes (i.e., potential carriers) with symmetric side-bands on either side similar to those shown in FIG. 12B, but this approach generally is impractical due to the non-ideal nature of unintentional carriers, the interference of other signals, and noise, as is shown in FIG. 13.

Test runs using arbitrary programs or benchmarks may provide some information about the frequency and properties of carriers that are modulated by system activity, but as can be appreciated by one of skill in the art, such methods make it difficult to determine the spectral properties of such arbitrary system activity. Even with foreknowledge regarding the spectral information relating to the activity in an application, it would be hard to recognize whether the side-band signals around each potential carrier match that spectrum with high confidence because amplitude modulation combines (i.e., convolves) the spectrum of the possibly non-ideal carrier signal with the likely vaguely shaped spectrum of the benchmark, and noise and unrelated signals that overlap with portions of the modulated-signal spectrum further hamper recognition of such a complicated overall spectrum.

Thus, while systems and methods of the present disclosure typically cannot directly control the shape of a computing device's intrinsic carrier signals, the disclosed systems and methods can utilize micro-benchmarks described in the section immediately preceding to generate computing device activity that is as close to a perfect square wave as possible given the practical limitations. This generated computing device activity based on micro-benchmarks results in side-band signals whose spectrum has a shape that closely matches the shape of the carrier signal they are modulating, with a $f_{alt}$ separation between the carrier and its two side-bands in the spectrum (similar to the spectrum shown in FIG. 12D. As will be appreciated, such side-band signals generated according to the presently disclosed systems and methods can be used to find carriers automatically by looking for such right and left side-band signals because they appear as peaks in the spectrum separated by $2f_{alt}$ with the carrier peak half-way between them. This approach has certain drawbacks, however. For example, the alternation activity is a square wave which has many odd-numbered harmonics ($f_c \pm f_{alt}$, $f_c \pm 3 \ f_{alt}$, etc.) that are separated by exactly 2 $f_{alt}$ which, as will be appreciated, makes it difficult to attribute the spikes in the side-band signals to particular carrier frequencies, thus creating many false positive indications of carrier locations. Additionally, for some values of $f_{alt}$, some of the side-band signals may be overwhelmed by noise and unrelated signals, which can also result in many false negatives. Further, computer systems and devices contain many components with periodic activity, so unmodulated signals often are concentrated at specific frequencies. Thus it is reasonably likely that at least some such spectral peaks will be nearly $2f_{alt}$ apart, thereby resulting in more false positives.

Figure 15A:
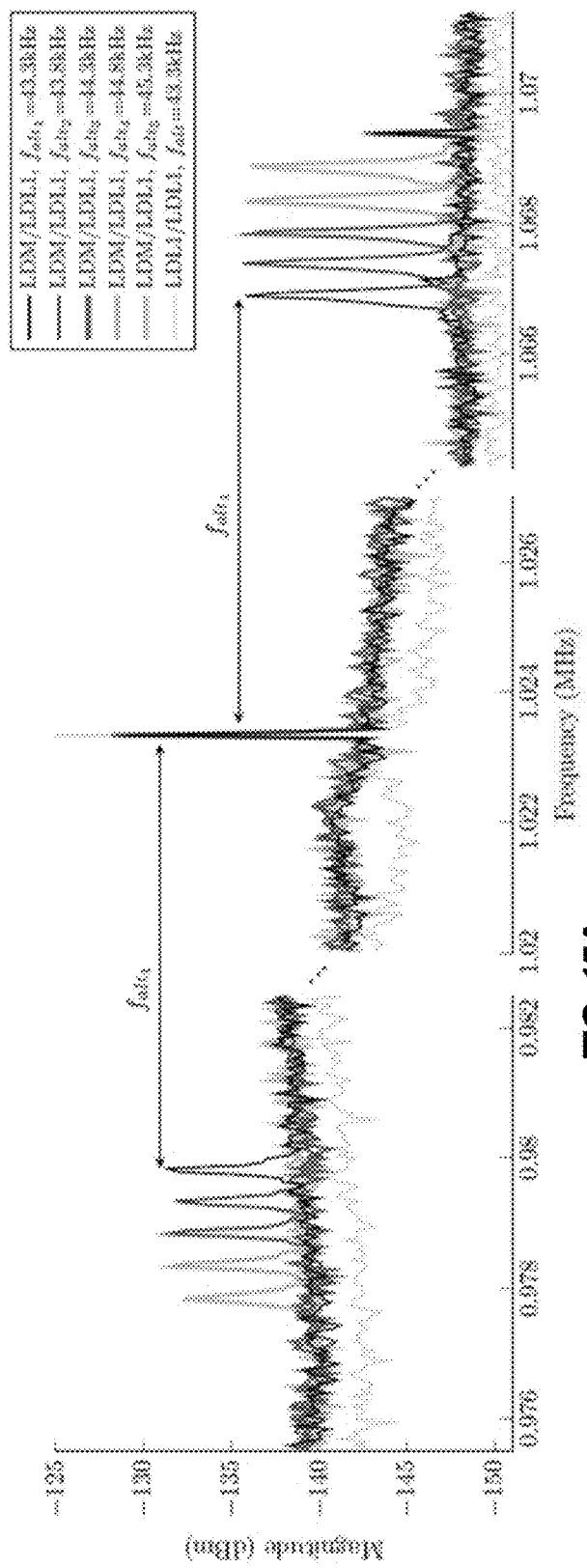
FIG. 15A illustrates a plurality of recorded spectra using different alternation frequencies.
Figure 15B:
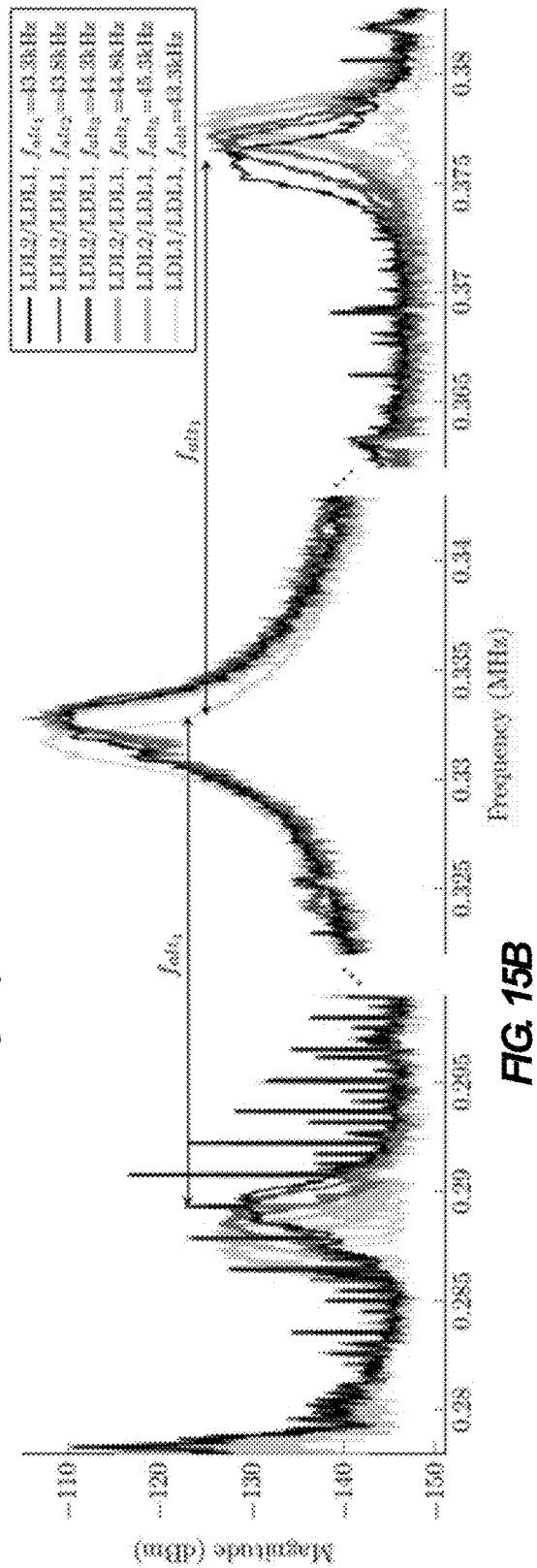
FIG. 15B illustrates a recorded spectra relating to a switching regulator-related carrier at $f_c$, according to an example embodiment.

Many of these drawbacks caused by the harmonics of the alternation signal and by the existence of unrelated signals can be resolved by performing multiple measurements using different alternation frequencies (e.g., $f_{alt1}$, $f_{alt2}=f_{alt1}+f_\Delta$, $f_{alt3}=f_{alt1}+2f_\Delta$, etc., where $f_\Delta$ typically is small compared to $f_{alt}$). FIG. 15 illustrates five recorded spectra using different alternation frequencies. In particular, FIG. 15 illustrates five spectra recorded according to the disclosed systems and methods with $f_{alt1}$=43.3 kHz and $f_\Delta$=0.5 kHz around a carrier signal at $f_c$=1.0235 MHz. To avoid clutter, FIG. 15 only shows the three parts of the spectrum that contain the left sidebands, the carrier, and the right sidebands of the signals. In other words, FIG. 15 does not show approximately 40 kHz worth of spectrum to the left and right of the carrier. As shown in FIG. 15, the disclosed systems and methods are configured to provide the plurality of spectra such that the peaks in the sidebands move by $f_\Delta$ as the alternation measurements. As will be appreciated, this approach virtually eliminates external signals and system-emanated periodic signals that do not correspond to activity-induced AM modulation because the spectral features resulting from such signals do not change as $f_{alt}$ changes. Further, the disclosed approach can identify modulated carriers using the spectral features that correspond to the first harmonic of $f_{alt}$ (i.e., the spectral features located $f_{alt}$ to the right and to the left of the carrier). Additionally, as is understood by one of skill in the art, alternation activity changes abruptly and may not have a perfect 50% duty cycle, so the alternation activity creates signals that correspond to other harmonics in the spectrum of the modulated signal, and the spectral features of these harmonics are located at $f_c \pm 2f_{alt}$, $f_c \pm 3f_{alt}$, etc. For example, if for some carrier signal there is strong interference that affects the side-band spectral features for the first harmonic of several alternation frequencies ($f_c \pm f_{alt}$), the spectral features that correspond to at least some of the other harmonics may (and often are) unaffected by such interference. Without loss of generality, and for the purposes of explanation, the disclosed systems and methods are described in the context of the first harmonic, but the same systems and methods can be applied to any harmonic of the alternation frequency. It is also possible to select the harmonic that has the best signal-to-interference properties.

Once a first harmonic side-band signal has been determined by the disclosed systems and methods, it is possible to determine whether the first harmonic side-band signal is the left side-band (i.e., it moves by $-f_\Delta$) or the right one (i.e., it moves by $f_\Delta$). According, with such a determination, the disclosed systems and methods can compute the frequency of determined first harmonic side-band signal's carrier signal. In particular, the system can determine that the carrier is located at $f-f_{alti}$ if the modulated peaks are detected at frequency f and if $f_{alt1}$ is to the left of $f_{alt5}$ (or at $f+f_{alti}$, if $f_{alt1}$ is to the right of $f_{alt5}$). As will be appreciated, detection of a single harmonic of $f_{alt}$ in a single side band is sufficient to detect a carrier frequency. Put differently, the disclosed systems and methods generally do not need all harmonics to determine the frequency of the carrier. Also, it will be appreciated that any harmonic (e.g., ±2nd, ±3rd, etc.) generally is sufficient for determining the carrier since the observed spacing between the side-band peaks is unique for each harmonic (e.g., 2 $h_\Delta$ for the positive 2nd harmonic, -3 $h_\Delta$ for the negative third harmonic, etc.). It will be appreciated that this property is useful if one or more signals overlap with other signals or include unusually strong noise because five measurements provide a total of ten side-band signals (two side-bands per measurement) at different frequencies. Accordingly, the disclosed systems and methods can reliably detect the presence of modulation and the frequency of the carrier even if several of the side-band signals are obscured. It will also be appreciated that aspects of the disclosed systems and methods generally do not rely on actually observing a peak for the carrier signal, which can be located in a crowded part of the spectrum. Instead, in some embodiments, the disclosed systems and methods deduce the frequency of the carrier from the side-band signals as at least a few of the side-band signals generally "land" in a "quiet" part of the spectrum. Put differently, embodiments of the disclosed technology locate carriers by searching for a shape that shifts by $f_\Delta$ when $f_{alt}$ changes by $f_\Delta$.

Automating the Process Detecting Amplitude-Modulated Side-Channel Emanations

As noted, aspects of the present disclosure generally relate to systems and methods for identifying by searching for a shape that shifts by $f_\Delta$ when $f_{alt}$ changes by $f_\Delta$. But as will be appreciated, visual comparison of numerous recorded spectra across a wide range of frequencies can be tedious and error prone. Accordingly, certain implementations of the disclosed technology utilize a heuristic for identifying the relevant side-bands whose shift in frequency correspond to shifts in $f_{alt}$.

According to certain embodiments, for a given harmonic h of $f_{alt}$, function $F_h(f)$ is intended to have a large value for a frequency that corresponds to a activity-modulated carrier. Embodiments of the disclosed technology can compute this score as $$F_h(f) = \Pi F_{i,h}(f) \quad (1)$$

where $F_{i,h}(f)$ is a sub-score for the h-th harmonic of $f_{alt}$ in the i-th recorded spectrum (i-th $f_{alt}$). This sub score can be computed as $$F_{i,h}(f) = \frac{SP_i(f + h \cdot f_{alt_i})}{\frac{1}{N-1}\sum_{j \ne i} SP_j(f + h \cdot f_{alt_j})} \quad (2)$$

As will be understood, function (2) first appropriately shifts the frequency so its result corresponds to the frequency of the carrier $f_c$ rather than the frequency of the expected side-band signal $f_c+f_{alt_i}$ (i.e., aspects of the disclosed systems and methods score the side-band signals, but then "report" the sub-score at the carrier frequency).

In certain embodiments, the value of the sub-score is computed by normalizing the strength of the side-band signal in this spectrum by the average, maximum, or other summary statistic of the other N-1 spectra that correspond to $h \cdot f_{alt_j}$ for values of j that are different from i. As will be understood by one of skill in the art, for side-band signals that shift in frequency as $f_{alt}$ changes, the sub-score for a particular i will be larger than 1 because the side-band signal is stronger at the $f_c+h \cdot f_{alt}$ frequency in this spectrum, but at the exact same frequency, in at least some of the other spectra, the signal will not be as strong because they have peaks at $h \cdot f_{alt_j}$. Accordingly, their side-band signal is at a different frequency. In contrast, a strong signal that does not shift in frequency as $f_{alt}$ changes will stay at the same frequency in the other spectra, so the normalization will produce a score close to 1. The overall score $F_h(f)$ multiplies the sub-scores, so the overall score is close to 1 if no $f_{alt}$-induced frequency shifting occurs. If each i-th spectrum has side-band signals at $h \cdot f_{alt_i}$, the frequency-shifted sub-scores will align, thus producing a large value for the carrier frequency. Finally, if only some side-band signals are present (one or a few may be "buried" by some unrelated signal), the overall score will be weakened because each $h \cdot f_{alt_i}$, where the side-band is obscured, will have a sub-score close to 1, but the remaining sub-scores will still increase the overall score significantly above 1. Finally, each harmonic h can be used to produce a score for the carrier signal, and the overall score can be computed as the average, sum, maximum, or another appropriate summary statistic that combines harmonic-specific sub-scores into an overall score.

Figure 16:
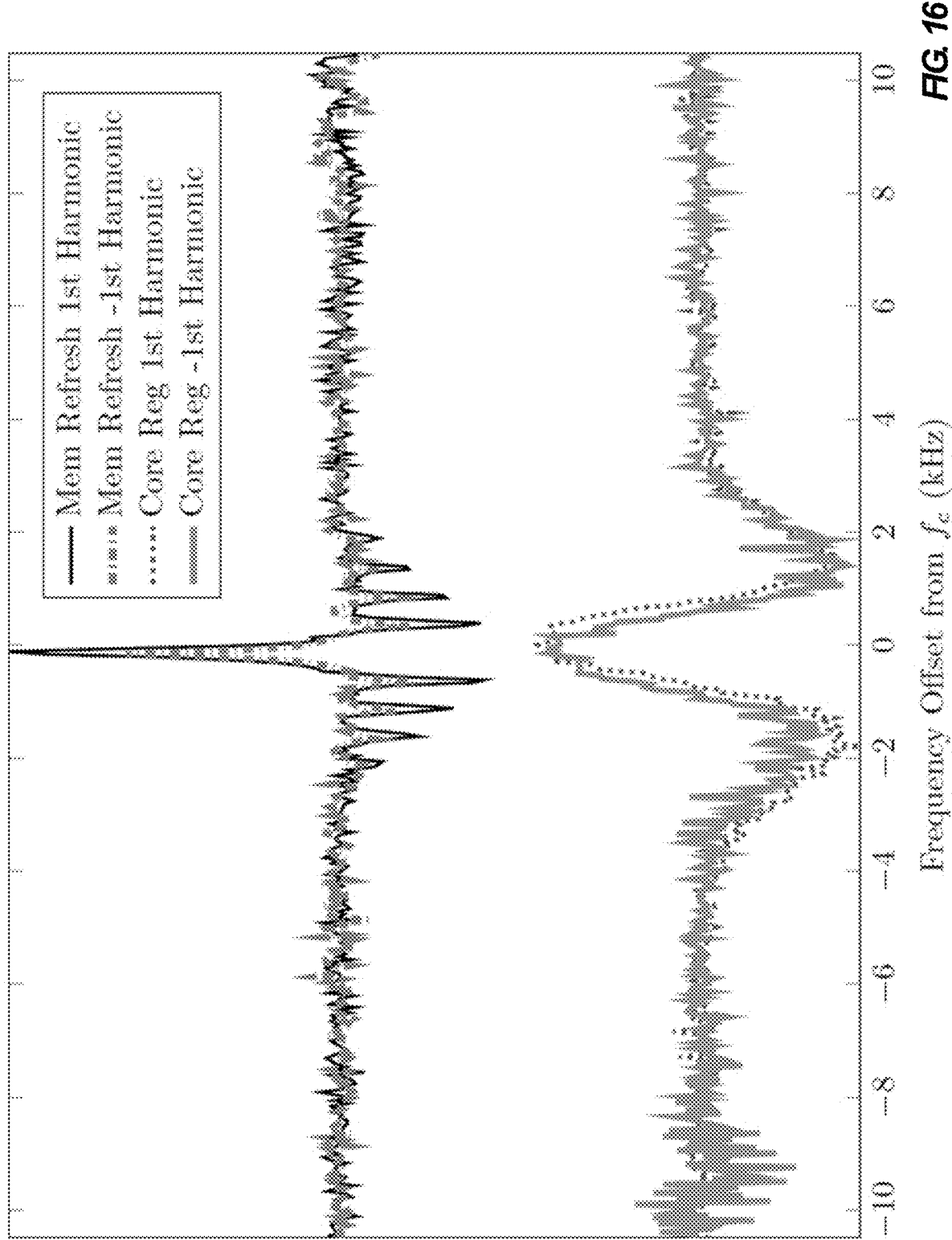
FIG. 16 illustrates an output of a heuristic function for carriers depicted by the spectra shown in FIGS. 15A and 15B, according to some embodiments.

Overall, as will be appreciated, this heuristic produces large scores (peaks) at the frequencies of modulated carriers and is almost completely flat at all other frequencies. Accordingly, FIG. 16 shows the output of the above heuristic function for the carriers shown in FIGS. 15A and 15B.

As will be appreciated, and as described previously, exemplary systems of the present disclosure can utilize a magnetic loop antenna (e.g., an AOR LA400) connected to a spectrum analyzer (e.g., spectrum analyzer MXA N9020A from Agilent). Thus, in some embodiments, a system for determining amplitude-modulated side-channel emanations of a computing device may comprise (i) the computing device to be measured, (ii) a code structure (e.g., code structure 1400) to be executed by the computing device to be measured, and (iii) a magnetic loop antenna connected to a spectrum analyzer (the "measuring apparatus") for determining the various side-channel emanations from the computing device when executing the instructions. In some implementations, a system of the present disclosure may utilize various measurement parameters shown in FIG. 17. Accordingly, in some embodiments, systems and methods of the present disclosure can perform various measurement campaigns across different frequency ranges and with different parameters, as shown in FIG. 17. As will be appreciated, parameters $f_{alt_1}$, and $f_A$ can be chosen to ensure sufficient separation between side band and carrier, and between the peaks generated (e.g., $f_{alt_1}$, $f_{alt_2}$, etc.). As will be appreciated, aside from this consideration, the choice of $f_{alt}$ and $f_c$ generally is arbitrary, with the caveat that while using only one choice $f_{alt}$ and $f_c$ is almost always sufficient to detect all carriers, measuring with multiple choices of $f_{alt}$ and $f_c$ increases the confidence that all carriers have been detected. For example, a carrier might be missed if the disclosed system is only run with one choice of $f_{alt_1}$ and $f_A$ and a carrier is weak and strong signals happen to occur at the side-bands. Typically, five alternation frequencies (e.g., $f_{alt_1}$ through $f_{alt_1}+4f_A$) are sufficient to detect almost any carrier even in the presence of unrelated signals from other system activity, noise, and radio broadcasts.

As will be appreciated, in certain embodiments, the $f_{res}$ parameter is the resolution of spectrum sampling. Thus, in the example provided, the 0-4 MHz measurements utilized $f_{res}$=50 Hz, so each recorded spectrum had 4,000,000/50=80,000 data points (frequencies). Each spectrum was measured 4 times over several hours and averaged, and the example system embodiment utilized the heuristic function described above to detect the 1st, 2nd, 3rd, 4th and 5th positive and negative harmonics of the alternation activity. Both visual inspection and algorithms can then be utilized to inspect the heuristic function's output to identify peaks, which identify carriers modulated by system activity.

As will be appreciated, embodiments of the disclosed system can utilize a variety of activities as activities X and Y in the alternation loop. For example, a system can utilize integer multiplication, division, addition, subtraction, as well as load and store to all levels of the cache hierarchy, or any other activities/instructions that might be relevant to a developer's work.

Certain test results utilizing an embodiment of the disclosed system focus on three particular X/Y alternations. The first alternates between a load from main memory (LLC miss) and a load from L1 cache (L1 hit), which can be characterized as LDM/LDL1. As will be appreciated, this alternation is useful in exposing modulated carriers related to memory activity. The second X/Y alternation alternates between L2 hits and L1 hits (LDL2/LDL1). As will be appreciated, this alternation is useful in exposing carriers related to variations in activity on the processor chip. Third, use of LDM, LDL2 and LDL1 can be methodologically convenient in that it uses the same micro-benchmark code for all three activities. They differ only in the mask values shown in code structure 1400, which thus provides excellent confidence that any observed modulation is due to differences between LDM, LDL1, and LDL2 activity, and not the other activity (address computation, looping, etc.) in the alternation loop.

Aspects of the present disclosure further can be used to identify sources of determined carrier signals. For example, information determined by an embodiment of the disclosed system such as carrier frequency, harmonics, modulation depth, and modulation activity (e.g. on-chip activity or memory activity) can be utilized to identify the sources of various carrier signals, which is helpful is mitigating compromising emanations. The following sections address experimental results utilizing an embodiment of the presently disclosed systems and methods.

Switching Voltage Regulators

An example measurement campaign identified peaks at multiples of 315 kHz. Because the even harmonics of this carrier were relatively strong, it was concluded that the carriers were likely caused by some behavior that repeats at 315 kHz and has a small duty cycle. As will be appreciated, it can be helpful to look at each harmonic's shape in the associated spectrum and, in the case of the foregoing example, the carrier's energy was spread around its central frequency by what looks like a Gaussian distribution. As will be understood by one of skill in the art, clock signals for digital logic and I/O interfaces (such as memory) are tightly controlled but clocks generated by RC oscillators create carriers having energy spread around their central frequency by what looks like a Gaussian distribution. As will be appreciated, in computer systems, RC oscillators typically are used in switching regulators, which convert the 12V to 24V PSU or battery voltage to 1V to 2V supplies used by processors and memory. The duty cycle of the regulator's switching signal is small when the ratio between the input and output voltage is large, which helps in determining the 315 kHz signal is related to a switching voltage regulator. In tests, the source of the signal was localized using an EM probe to determine where the 315 kHz EM signal was strongest in the system being evaluated. It was determined that the signal was strongest near the high-power MOSFET switches and power inductors that supply power to the main memory DIMMs. These switches were driven by a nearby switching voltage regulator IC and its switching frequency was 315 kHz, thus confirming the hypothesis.

Once the source was found, the modulation mechanism was obvious: the regulator maintains the voltage supplied to the CPU by varying the duty cycle of the control signal of a switch between the 12V supply and the 1V output supply. For example, when DIMMs draw more current, the voltage at the regulator's output drops, so the regulator compensates by increasing the duty cycle of the switch by, for example, connecting the 12V supply to its output for a longer fraction of the fixed 315 kHz period. When running the LDM/LDL1 micro-benchmark according to an embodiment of the present disclosure, the DRAM regulator's duty cycle is increased during LDM and decreased during LDL1 activity. Changing the duty cycle changes (i.e., modulates) the amplitude of all of the signal's harmonics, which explains why LDM/LDL1 activity modulates the emanated signal at the harmonics of the regulator's switching frequency.

Similar identified signals can be caused by a voltage regulator that supplies the power to the on-chip memory interface (the chip has separate power supplies for its cores and its memory interface). In some instances, embodiments of the disclosed system can provide prominent Gaussian-like, but the disclosed heuristic function will not report them as modulated signals shapes because they are not significantly modulated by the relevant alternation. As will be appreciated, this illustrates the importance of not simply reporting strong or easy-to-notice signals that may not be actually modulated by the activity under observation.

In many recent processors, the core CPU voltage is adjusted dynamically, while many on-chip cache and memory interface designs require fixed voltage supplies. Therefore, some processors require separate voltage regulators for the CPU and cache. As demonstrated, a regulator's carrier is modulated by the activity in the circuit it provides power to, so an attacker can distinguish cache and CPU activity by demodulating each regulator's carrier separately. Also, when separate dynamic voltage scaling is used for each CPU core, each core requires a separate regulator. When such regulator switching frequencies are not identical, attackers might be able to remotely receive a separate power consumption readout for each core, allowing attackers to remotely perform a separate power analysis attack for each core.

Finally, it is noted that the emerging use of in-package/on-chip regulators for processors will likely affect regulator-related EM information leakage in new and interesting ways. Linear regulators have no switching frequencies modulated by system activity, so use of on-chip linear regulators would not produce modulated emanations. Notwithstanding, integrated switching regulators will have a more complex impact because each integrated regulator will supply a smaller part of the chip and therefore the switching currents are likely to be lower and follow shorter paths, which tends to reduce emanations. However, integrated switching regulators are likely to use much higher switching frequencies (e.g. 140 MHz) where EM emanations suffer from less noise. Part of the reason for the higher switching frequencies is that it allows faster reaction to changes in output voltage. For attackers, this means that the emanated signal will provide a much higher-bandwidth readout of the power consumption.

Memory Refresh

An example measurement campaign also identified a signal having harmonics at frequencies of 512 kHz, 1024 kHz, etc., having a stable frequency that suggested it was generated by logic that is clocked with a crystal-oscillator derived clock. Its harmonics were all of similar strength, which suggested an extremely small (i.e., <5%) duty cycle. Localization showed that this signal was strongest near the memory DIMMs, and additional experiments showed that the carrier signal was strongest when there is no memory activity and weakest when continuous memory activity was generated. As will be understood by one of skill in the art, such behavior is unusual since, assuming the signal is caused by memory activity, one would expect the signal to get stronger with more activity. Further measurements with small probes close to the memory revealed many additional harmonics with a greatest common divisor of 128 kHz, not 512 kHz as initially determined. As will be understood, 128 kHz corresponds to a period of 7.8 µsec, the maximum allowable average time between refresh commands for recent DRAM standards such as DDR3. Thus, evidence strongly suggests the signal is generated by memory refresh activity. The duty cycle memory refresh activity is very low (<3%) because each refresh command lasts approximately 200 µsec and occurs every 7.8 µsec. The refresh timing is derived from the memory controller clock, which is crystal-derived. While DRAM standards specify that the average time between refresh commands must not exceed 7.8 µsec, the memory controller has some control over the timing of the refresh commands. For example, the memory controller could postpone sending refresh commands during a 40 µsec period of intense memory activity, and then "catch up" when memory has some idle time. This explains a strange observation that the signal weakened (instead of getting stronger) as memory activity increases. When the memory is inactive, the memory controller simply sends memory refresh commands at regular intervals, resulting in the strongest signal at that interval's frequency. As memory activity increases, the memory accesses increasingly interfere with the timing of the refresh commands, causing refreshes to be delayed and disrupting their periodicity (thus spreading their emanated energy across a much larger frequency range and causing the signals at 128 kHZ, 256 kHz, etc. to weaken). Although the first harmonic of this signal was weaker than regulator-related signals, memory refresh produces many modulated harmonics and attackers can potentially correlate those to dramatically improve their detection of this signal and its signal-to-noise ratio.

As will be appreciated, based on such determinations, a developer can potentially minimize such signals by randomizing the issue of memory refresh commands, which would be compatible with existing DRAM standards and would greatly reduce the modulation of refresh activity.

DRAM Memory Clock

Figure 18:
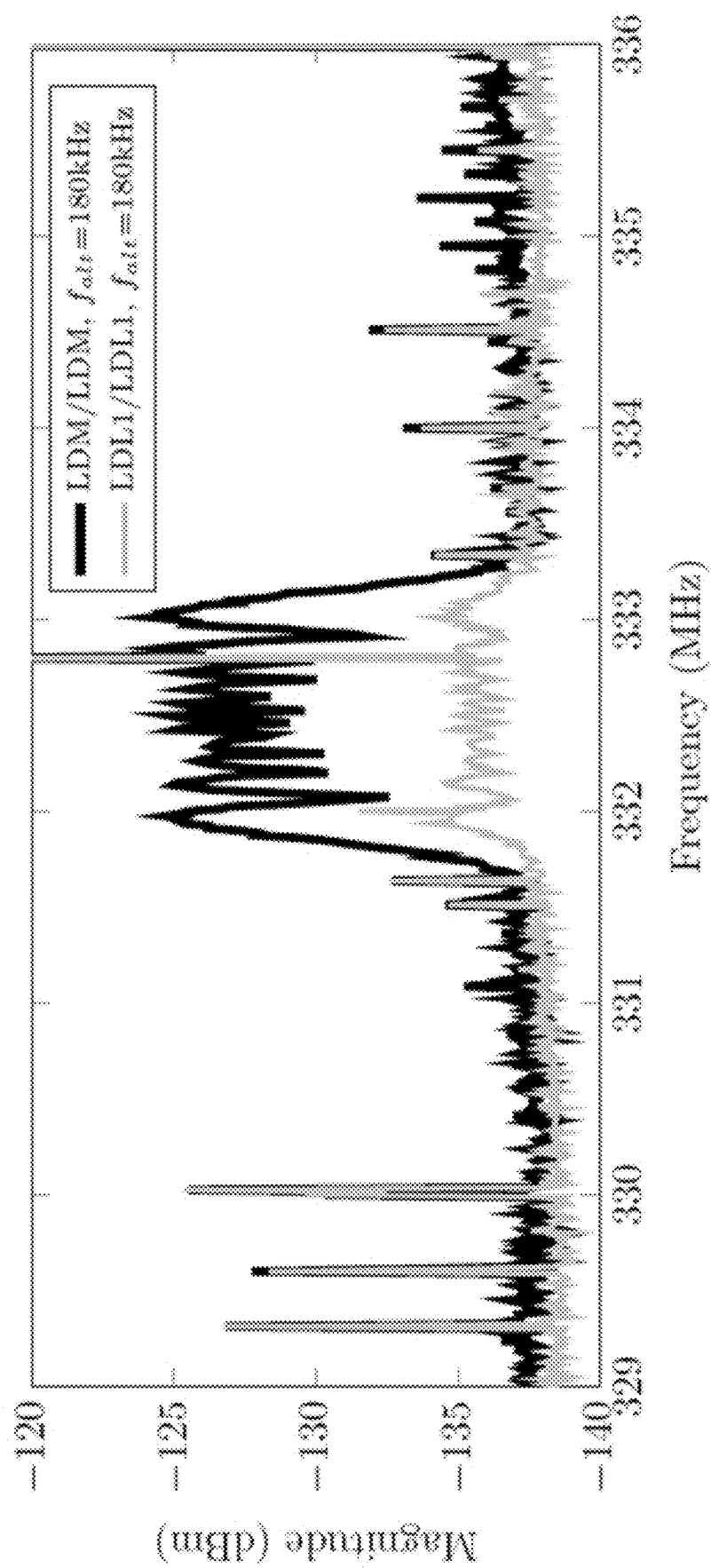
FIG. 18 is an exemplary spectrum according to example embodiments of the disclosed technology.

Above 30 MHz, electromagnetic compatibility (EMC) standards limit the allowable level of EM emanations from consumer devices such as computers. Many periodic signals, such as high frequency processor and memory clocks, are strong enough to grossly violate these limits, so alleviation techniques for these clock signals have been developed. EMC requirements specify the maximum magnitude for emissions at any particular frequency, and a popular technique (called "spread spectrum clocking") varies the clock frequency periodically, spreading the emitted energy across a range of frequencies (instead of emanating it all at one frequency). For example, a 333 MHz memory clock might be swept back and forth between 332 MHz and 333 MHz over a period of 100 µsec, producing a spectrum similar to FIG. 18. While such techniques facilitate compliance, they are unlikely to hinder attacks because a receiver can easily track the clock signal's slow changes. Thus, such "carrier tracking" techniques have already been developed in telecommunications to allow reception of radio signals transmitted using this technique.

While spread-spectrum clocking does not significantly mitigate information leakage, it creates interesting problems for discovering such modulated carriers through analysis of the spectrum. The shape of the carrier and its side-bands is less recognizable, and the carrier and its side-band signals are likely to overlap significantly when using modulation activity that is not carefully chosen. The signals are only weaker in an averaged sense: attackers can still track the carrier and use the full power of the signal after demodulation.

Figure 19A:
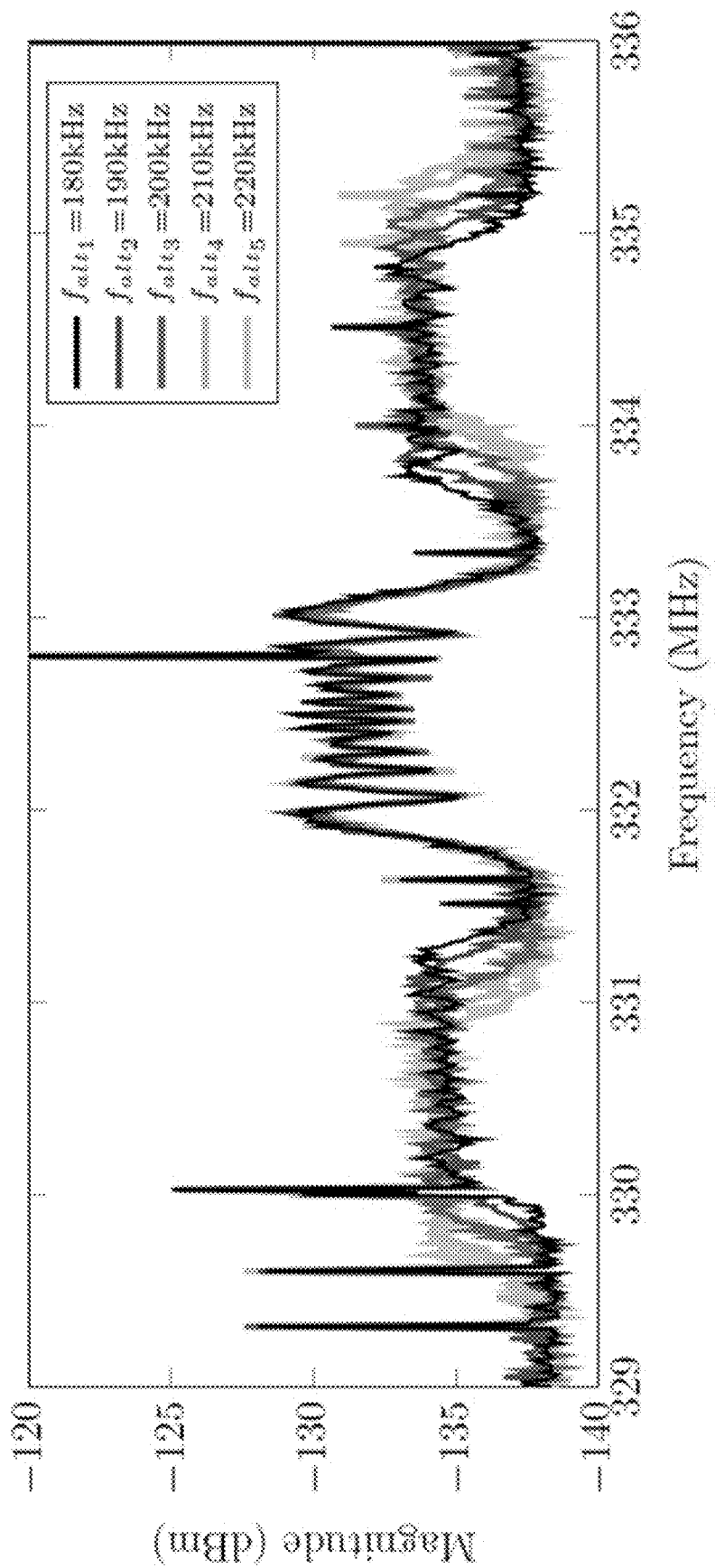
FIG. 19A is a spectrum showing the effect modifying the spectrum of FIG. 18 by moving side-band signals outside of the carrier's own spectrum.
Figure 19B:
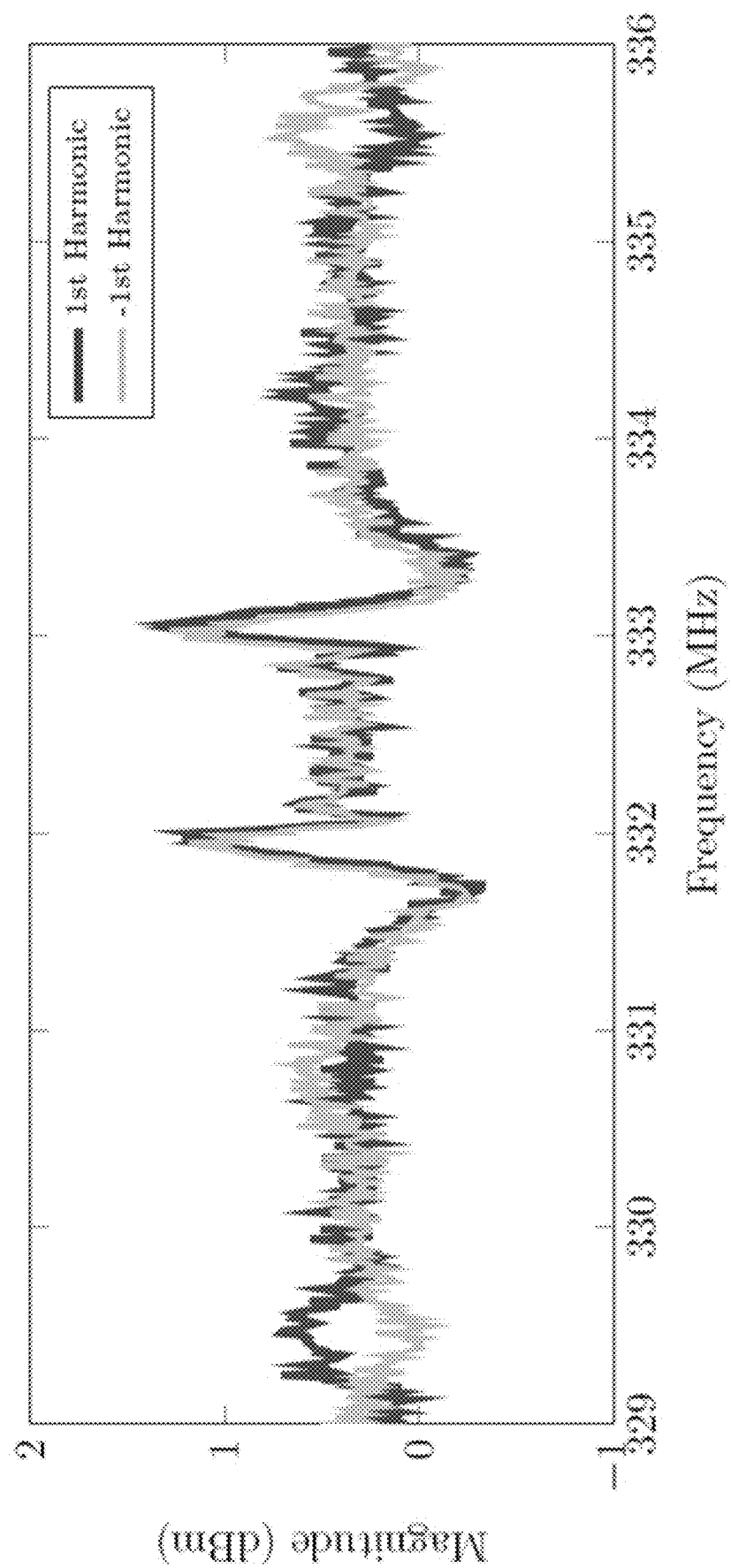
FIG. 19B is a spectrum illustrating use of an embodiment of the disclosed heuristic function on the spectrum of FIG. 19A.

Thus, to allow the disclosed systems and methods to successfully detect modulated spread-spectrum clocks, it is possible to set $f_{alt}$ large enough to move the side-band signals outside of the carrier's own spectrum. FIG. 19A shows the effect of modulating the clock signal at several such alternation frequencies, and FIG. 19B illustrates that the heuristic function does detect such modulated signals though it reports the clock as two separate carriers at the edges of the spread out clock signal.

Figure 20:
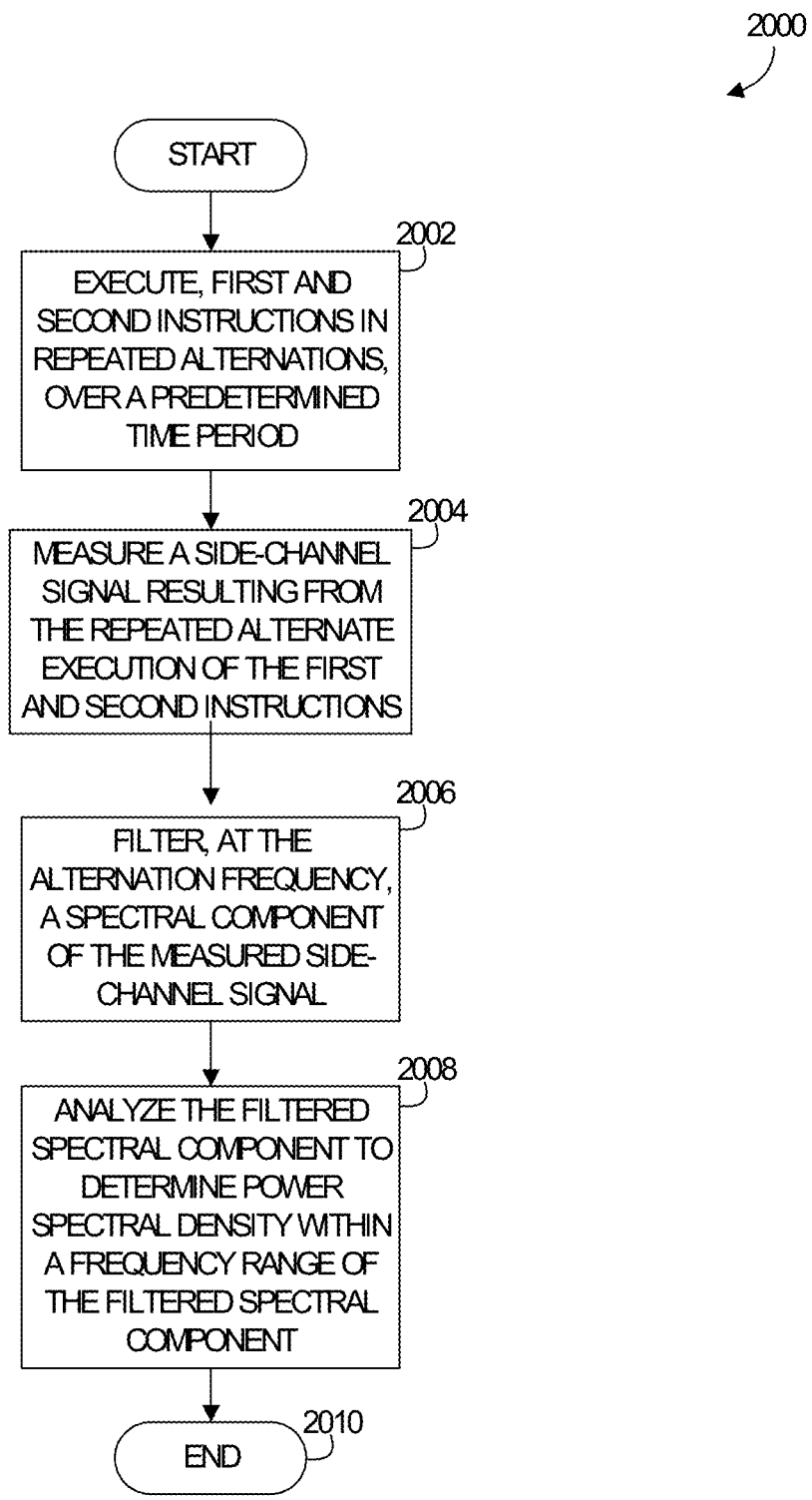
FIG. 20 is a flow chart of an exemplary method according to certain embodiments of the disclosed technology.

FIG. 20 is an exemplary flow chart of a method 2000 according to some embodiments of the disclosed technology. As shown in FIG. 20, in some embodiments, a method 2000 comprises repeatedly executing 2002 first and second instructions in an alternating fashion for a predetermined time period. Thus, in some embodiments, a processor executes the first instruction a predetermined number of times (e.g., 10 times) and then executes the second instruction the same predetermined number (i.e., 10 times). Further, in some embodiments, the processor repeatedly executes the first and second instructions the predetermined number of times until the expiration of a predetermined time period. Thus, for example, the processor executes the first instruction 10 times, then executes the second instruction 10 times, then the first instruction 10 times, then the second instruction 10 times, etc. Further, in some embodiments of the disclosed technology, executing the first and second signals a predetermined number of times occurs over a duration of time that corresponds to an alternation frequency.

Further, as shown in FIG. 20, in some embodiments, the method 2000 can comprise measuring 2004 a side-channel signal that results from the processor executing the first and second instructions in repeated alternations. As previously discussed and as will be understood by one of skill in the art, such side-channel signals are unintentional side effects or consequences that result from execution of the instructions. That is, the side-channel signals result from internal system activity. Further, the side-channel signals comprise superpositions of first and second signal energies that result from the processors execution of the first and second signals, respectively.

In some embodiments, the method 2000 can further comprise filtering 2006 a spectral component of the measured side-channel signal at an alternation frequency corresponding to the alternating execution of the first and second signals. As will be appreciated, filtering a spectral component at the alternation frequency allows the disclosed systems and methods to filter various unwanted information such as noise and other side-channel signals that also result from the various processes necessary to execute the first and second instructions.

Additionally, as shown in FIG. 20, the method 2000 can include analyzing 2008 the filtered spectral component to determine power spectral density within a frequency range of the spectral component. As will be appreciated, the power spectral density can represent the difference between the first signal energy and the second signal energy. In some embodiments, the method 2000 can then end 2010.

In certain embodiments, a first processor of a first computing device can execute the first and second instructions, while a second processor at a second computing device can filter and analyze the measured side-channel signals. It will be understood, however, that the first and second processors can be included in the same computing device, or that the first and second processors can be the same processor. In other words, in some embodiments, the computing device that executes the first and second signals (and emanates the side-channel signals) can also filter and analyze the measured side-channel signals.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person of ordinary skill to practice certain embodiments of the disclosed technology, including making and using any devices or systems and performing any incorporated methods. The patentable scope of certain embodiments of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A method for identifying side-channel carrier frequencies, the method comprising:
    executing, at a first processor, different first and second instructions in a plurality of repeated alternations, wherein each alternation comprises executing, over a predetermined time period corresponding to an alternation frequency, the first instruction a first predetermined number of times followed by executing the second instruction a second predetermined number of times;
    measuring, via a measuring apparatus, spectra of one or more signals emanating from a device housing the first processor, the one or more signals emanating substantially contemporaneously with the first processor executing the first and second instructions;
    analyzing, by a second processor, data indicative of the spectra of the one or more signals to determine one or more side-channel candidate side-band pairs, each of the one or more side-channel candidate side-band pairs comprising a lower sideband at a first frequency and an upper sideband at a second frequency, the first frequency and the second frequency being separated by approximately twice the respective alternation frequency; and
    for each respective side-channel candidate side-band pair, identifying a side-channel carrier frequency at a frequency being at an approximate midpoint between a respective side-channel candidate side-band pair's first and second frequency.

2. The method of claim 1, wherein the first instruction and the second instruction each comprise an instruction sequence.

3. The method of claim 2, wherein the first and second instruction sequence differ in only one instruction.

4. The method of claim 2, wherein the first and second instruction sequence differ in a plurality of instructions.

5. The method of claim 1, wherein the first predetermined number of times and the second predetermined number of times are selected such that the first processor executes the first instruction for a predetermined fraction of the predetermined time period and executes the second instruction for a remaining fraction of the predetermined time period.

6. The method of claim 5, wherein the predetermined fraction of the predetermined time period is substantially half of the predetermined time period.

7. The method of claim 1, wherein executing the first and second instructions in repeated alterations creates a pattern of data-dependent activity in the device housing the first processor.

8. The method of claim 1, wherein the different first and second instructions each comprise x86 instructions.

9. The method of claim 1, wherein a side-channel carrier associated with an identified side-channel carrier frequency is modulated as a side-effect of the first processor executing respective first and second instructions corresponding to the identified side-channel carrier frequency in a way that corresponds to at least one modulation type selected from the group consisting of amplitude modulation, frequency modulation, phase modulation, and pulse width modulation.

10. The method of claim 1, wherein the first processor and the second processor are the same processor.

11. A method for identifying side-channel carrier frequencies, the method comprising:
    for each of a plurality of alternation frequencies:
        executing, at a first processor, different first and second instructions in a plurality of repeated alternations, wherein each alternation comprises executing, over a predetermined time period corresponding to a respective alternation frequency, the first instruction a first predetermined number of times followed by executing the second instruction a second predetermined number of times;
        measuring, via a measuring apparatus, spectra of one or more signals emanating from a device housing the first processor, the one or more signals emanating substantially contemporaneously with the first processor executing the first and second instructions;
        analyzing, by a second processor, the spectra of the one or more signals to determine one or more side-channel candidate side-band pairs, each of the one or more side-channel candidate side-band pairs comprising a lower sideband at a first frequency and an upper sideband at a second frequency, the first frequency and the second frequency being separated by approximately twice the respective alternation frequency; and
        for each respective side-channel candidate side-band pair, identifying a candidate side-channel carrier frequency at a frequency being at an approximate midpoint between a respective side-channel candidate side-band pair's first and second frequency to provide a set of candidate carrier frequencies corresponding to the respective alternation frequency; and
    comparing each set of candidate side-channel carrier frequencies to other sets of candidate side-channel carrier frequencies to identify one or more carrier frequencies, wherein identifying one or more side-channel carrier frequencies comprises identifying candidate side-channel carrier frequencies occurring in a plurality of sets of candidate side-channel carrier frequencies.

12. The method of claim 11, wherein the first instruction and the second instruction each comprise an instruction sequence.

13. The method of claim 12, wherein the first and second instruction sequence differ in only one instruction.

14. The method of claim 12, wherein the first and second instruction sequence differ in a plurality of instructions.

15. The method of claim 11, wherein the first predetermined number of times and the second predetermined number of times are selected such that the first processor executes the first instruction for a predetermined fraction of the predetermined time period and executes the second instruction for a remaining fraction of the predetermined time period.

16. The method of claim 15, wherein the predetermined fraction of the predetermined time period is substantially half of the predetermined time period.

17. The method of claim 11, wherein a side-channel carrier associated with an identified side-channel carrier frequency is modulated as a side-effect of the first processor executing respective first and second instructions corresponding to the identified side-channel carrier frequency in a way that corresponds to at least one modulation type selected from the group consisting of amplitude modulation, frequency modulation, phase modulation, and pulse width modulation.

18. A method for identifying side-channel carrier frequencies, the method comprising:
executing, at a first processor, different first and second instructions in a plurality of repeated alternations, wherein each alternation comprises executing, over a predetermined time period corresponding to an alternation frequency, the first instruction a first predetermined number of times followed by executing the second instruction a second predetermined number of times;
receiving, at a second processor and from a measuring apparatus, information indicative of spectra of one or more signals emanating from a device housing the first processor, the one or more signals emanating substantially contemporaneously with the first processor executing the first and second instructions;
analyzing, by a second processor, the information indicative of the spectra of the one or more signals to determine one or more side-channel candidate side-band pairs, each of the one or more side-channel candidate side-band pairs comprising a lower sideband at a first frequency and an upper sideband at a second frequency, the first frequency and the second frequency being separated by approximately twice the respective alternation frequency; and
for each respective side-channel candidate side-band pair, identifying a side-channel carrier frequency at a frequency being at an approximate midpoint between a respective side-channel candidate side-band pair's first and second frequency.

19. The method of claim 18, wherein the first processor and the second processor are the same processor.

* * * * *